United States Patent [19]
Bravman et al.

[11] Patent Number: 5,646,389
[45] Date of Patent: Jul. 8, 1997

[54] INVENTORY MANAGEMENT SYSTEM USING CODED RE-ORDER INFORMATION

[75] Inventors: Richard Bravman, Smithtown, N.Y.; Ynjiun P. Wang, Meyers, Fla.; D. C. Toedt, III, Houston, Tex.

[73] Assignee: Symbol Technologies, Inc., Holtsville, N.Y.

[21] Appl. No.: 661,731

[22] Filed: Jun. 11, 1996

Related U.S. Application Data

[60] Continuation of Ser. No. 351,708, Dec. 8, 1994, abandoned, which is a division of Ser. No. 923,766, Aug. 3, 1992, Pat. No. 5,393,965, which is a continuation-in-part of Ser. No. 612,664, Nov. 13, 1990, abandoned, and a continuation-in-part of Ser. No. 642,775, Jan. 18, 1991, Pat. No. 5,159,635, which is a division of Ser. No. 653,822, Feb. 11, 1991, Pat. No. 5,113,445.

[51] Int. Cl.⁶ ........................................ G06F 17/60
[52] U.S. Cl. ............................... 235/385; 235/383
[58] Field of Search .................................. 235/385, 383, 235/375

[56] References Cited

U.S. PATENT DOCUMENTS

| | | | |
|---|---|---|---|
| 4,639,875 | 1/1987 | Abraham et al. | 364/403 |
| 4,737,910 | 4/1988 | Kimbrow | 364/403 |
| 4,748,316 | 5/1988 | Dickson | 235/454 |
| 5,038,283 | 8/1991 | Caveney | 364/403 |
| 5,111,196 | 5/1992 | Hunt | 235/383 |
| 5,117,096 | 5/1992 | Bauer et al. | 364/403 |
| 5,168,445 | 12/1992 | Kawashima et al. | 364/403 |
| 5,178,417 | 1/1993 | Eshoo | 283/67 |
| 5,243,655 | 9/1993 | Wang | 235/462 |
| 5,271,643 | 12/1993 | Hafele | 283/81 |
| 5,305,199 | 4/1994 | Lobiondo et al. | 364/403 |

*Primary Examiner*—Donald T. Hajec
*Assistant Examiner*—Jeffrey R. Filipek
*Attorney, Agent, or Firm*—Finnegan, Henderson, Farabow, Garrett & Dunner, L.L.P.

[57] ABSTRACT

Inventory item records are affixed to inventory item holders. The inventory item records comprise two-dimensional bar code labels containing encoded item identification information and reordering information for ordering replacement inventory items. The replacement inventory items are labeled with two-dimensional bar-coded information describing the ultimate destination, and packed into a container for shipment to a receiving/distribution center. The destination information is scanned and decoded at the receiving/distribution center to enable proper routing of the replacement inventory items.

22 Claims, 25 Drawing Sheets

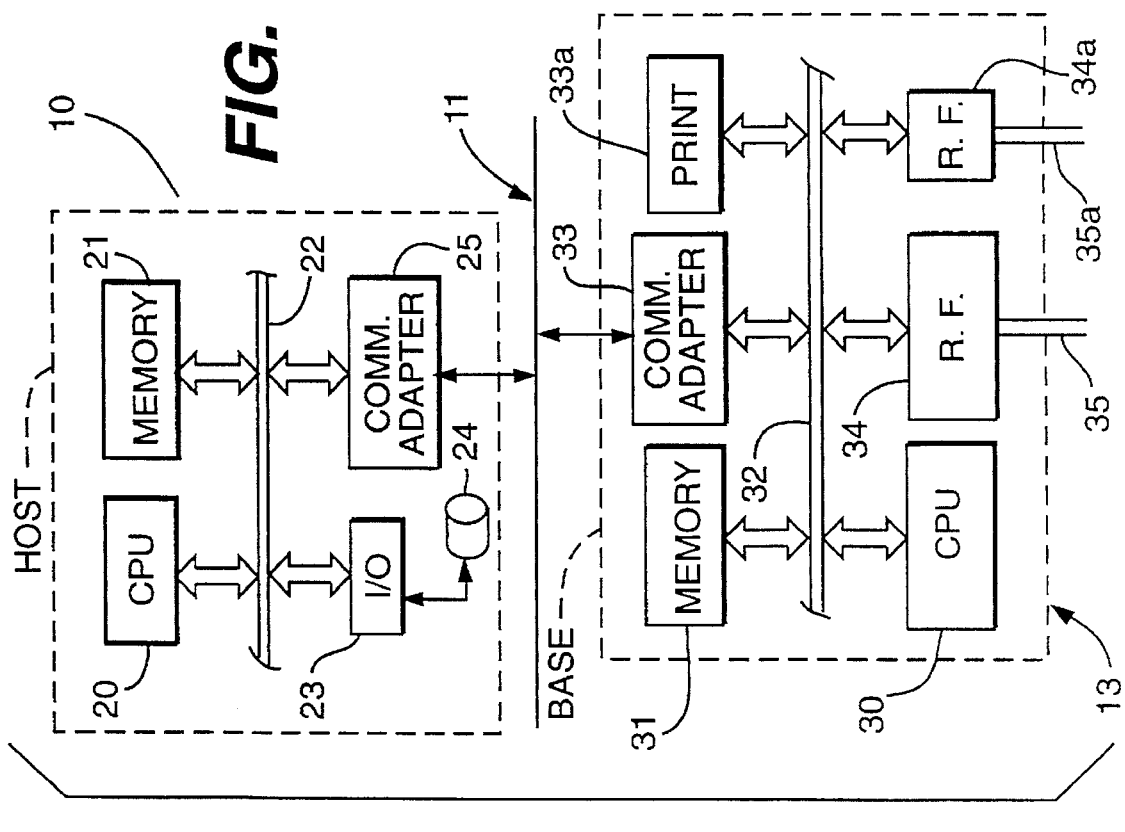
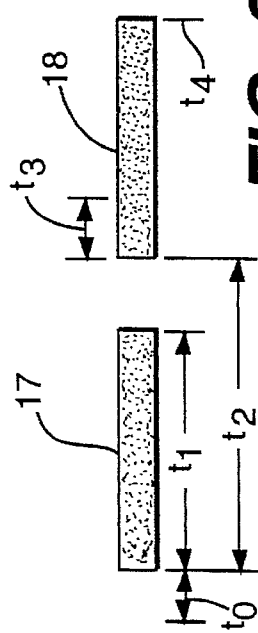
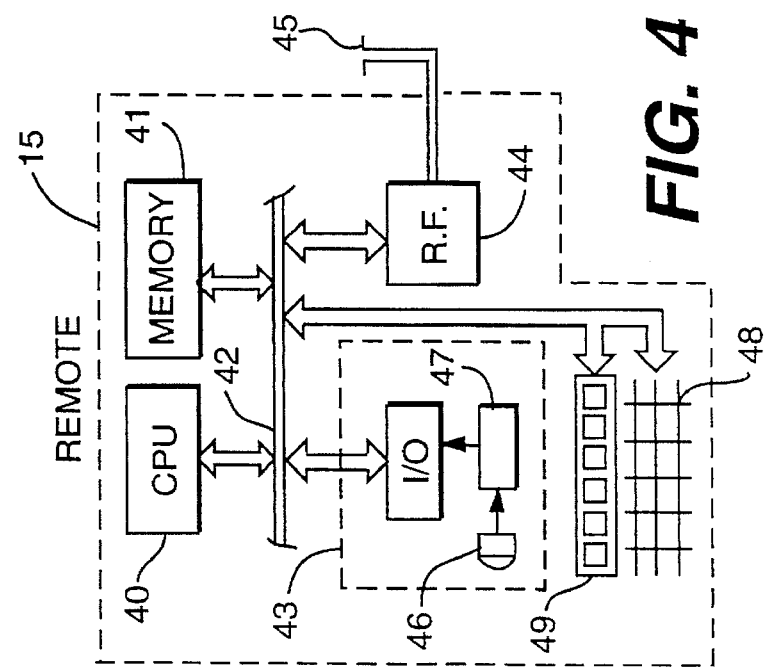

| PDF 417 SECURITY LEVEL | |
|---|---|
| SECURITY LEVEL | ERROR CORRECTION CODEWORDS |
| 0 | 0 |
| 1 | 2 |
| 2 | 6 |
| 3 | 14 |
| 4 | 30 |
| 5 | 62 |
| 6 | 126 |
| 7 | 254 |
| 8 | 516 |

| COLUMN | 1 | 2 | 3 | 4 | 5 | 6 | 7 | 8 | 9 | 10 |
|---|---|---|---|---|---|---|---|---|---|---|
| VALUE | $L_2$ | V | V | V | BAD | V | BAD | V | V | $R_1$ |
| CLUSTER | 6 | 6 | 6 | 6 | BAD | 3 | BAD | 3 | 3 | 3 |

| COLUMN | 1 | 2 | 3 | 4 | 5 | 6 | 7 | 8 | 9 | 10 |
|---|---|---|---|---|---|---|---|---|---|---|
| VALUE | $L_2$ | V | V | V | BAD | V | BAD | V | V | $R_1$ |
| CLUSTER | 6 | 6 | 6 | 6 | BAD | 3 | BAD | 3 | 3 | 3 |
| WEIGHT | H | H | H | M | | L | | M | H | H |

FIG. 26B

| COLUMN | 1 | 2 | 3 | 4 | 5 | 6 | 7 | 8 | 9 | 10 |
|---|---|---|---|---|---|---|---|---|---|---|
| VALUE | $L_2$ | V | V | V | BAD | V | BAD | V | V | $R_1$ |
| CLUSTER | 6 | 6 | 6 | 6 | BAD | 3 | BAD | 3 | 3 | 3 |
| WEIGHT | H | H | H | M | | L | | M | H | H |
| ROW | 2 | 2 | 2 | 2 | | 1 | | 1 | 1 | 1 |

FIG. 26C

INVENTORY MANAGEMENT SYSTEM USING CODED RE-ORDER INFORMATION

This is a continuation of application Ser. No. 08/351,708, filed Dec. 8, 1994, now abandoned, which is a division of application Ser. No. 07/923,766, filed Aug. 3, 1992, now U.S. Pat. No. 5,393,965, which is a continuation-in-part of Ser. No. 07/612,664, filed Nov. 13, 1990, now abandoned, and Ser. No. 07/642,775, filed Jan. 18, 1991, now U.S. Pat. No. 5,159,635, which is a division of Ser. No. 07/653,822, filed Feb. 11, 1991, now U.S. Pat. No. 5,113,445, all of which are relied upon and incorporated by reference herein.

BACKGROUND OF THE INVENTION

The present invention relates generally to apparatus for utilizing scanners in conjunction with bar codes, and more particularly to systems for replacing depleted inventory items.

Large retail stores frequently have many checkout lanes in order to be able to handle higher customer throughput at peak periods. Such lanes tend to be crowded together as much as possible in an attempt to minimize the square footage required for the checkout function. Many of these lanes, however, remain idle during a considerable portion of any given business day, thereby wasting the square footage allocated to them.

A modern grocery store checkout lane typically includes a cash register that is used to check out merchandise items bearing bar code labels. A cashier removes items from a movable conveyor belt one a time, drags them across the laser beam of a fixed scanner (e.g., a "slot" scanner built into a horizontal counter), and places them on a shopping carrier, such as a cart. A fixed scanner is linked with a processor, e.g., a CPU built into the cash register, that translates the bar code symbol on a package into a cash register entry including the price of the scanned item and, e.g., a brief description of the item. In some implementations the translation may be direct, i.e., the price of the item is encoded in the bar code itself. In other implementations, the translation is indirect, i.e., the bar code encodes item identification information that is used as the input to a lookup table, e.g., in disk storage, from which information such as the price and brief description are obtained.

Downstream of the cash register on the conveyor belt is a sacking station; one or more baggers removes previously scanned items from the conveyor belt and places the items in paper or plastic sacks. (Some items, e.g., non-canned fruits and vegetables, are not scanned; their prices are entered manually using a cash register keyboard and/or a scale). When all items have been scanned or otherwise checked, the cash register tallies the prices of the items, factors in any discounts (e.g., coupon discounts) or other adjustments (e.g., sales taxes on some items), displays the total to be paid by the customer, and prints a receipt. In sophisticated systems, the cash register is linked with a host computer via cabling or other arrangement. While the purchases are being "rung up," the customer may write a check to pay for the purchases at a check-writing counter.

An aspect of this arrangement which limits the efficiency is the fact that typically only one person at a time empties a shopping cart and scans the items contained therein. Two or more persons could theoretically share a fixed scanner, but this could easily create physical coordination problems involving each person getting in the other person's way.

Another factor which limits efficiency is that a certain amount of time is required for the cashier to verify that the customer's check is not obviously a "bad check" (e.g., by transmitting the customer's driver's license number to a central clearing house).

Thus, to improve the throughput it is desirable to separate the checkout function of taking inventory of the customers purchases from the payment receiving function.

It is also desirable to be able to automatically debit a person's checking account or credit card either at the reported payment station or by passing the payment station completely. This of course eliminates the need for the customers to write a check, the store to clear it, or to process and clear a credit card.

Although, it is possible to use conventional bar codes to identify customers and match up carts and checking account numbers at the separate stations; there is an opportunity for unscrupulous persons to change or substitute the conventional bar codes in order to decrease the amount paid to the store or to substitute a different funds transfer number.

SUMMARY OF THE INVENTION

An object of the present invention is to provide a system able to encode and read bar code in a form that is more difficult to duplicate and is able to contain more information per unit of space than conventional bar codes for managing the inventory of an establishment.

Additional objects and advantages of this invention will be set forth in part in the description which follows and in part will be obvious from that description, or may be realized and attained by means of the instrumentalities and combination particularly pointed out in the appended claims.

To achieve the objects and in accordance with the purpose of the invention as broadly described herein, a system for storing and managing inventory comprising an inventory item holder for holding at least one inventory item; an inventory item record, including a two-dimensional bar code symbol label applied to the inventory item holder, the record including encoded item identification information identifying the at least one inventory item and reordering information for the at least one inventory item; a two-dimensional bar code reader for decoding the two-dimensional bar code symbol label to obtain the item identification information and the reordering information; means for comparing a count of the number of the inventory items physically present at the inventory holder with a reorder count in the reordering information; and means, responsive to the comparing means, for generating a reorder message.

The inventory storing and managing system further includes means for transmitting an order, derived from the reorder message, to an origination point for the transportation of the at least one inventory item; means for generating a two-dimensional bar code symbol label for application to the inventory item, containing item destination information identifying a destination point; means for transporting the at least one inventory item from the origination point to a redistribution point; a bar code reader at the redistribution point, including decoding means for decoding the two-dimensional bar code symbol label relating to the item destination information; and means for transporting the at least one inventory item from the redistribution point to the destination point.

BRIEF DESCRIPTION OF THE DRAWINGS

FIG. 2 is a timing diagram showing events (RF transmission) vs. time for a data transmission sequence in the illustrative system of FIG. 1;

FIG. 3 is a more detailed electrical schematic diagram in block form of the host computer and one of the base stations in the illustrative system of FIG. 1;

FIG. 4 is a more detailed electrical diagram, in block form, of one of the remote terminals in the system of FIG. 1;

FIG. 24 is a diagram illustrating the various width measurements that are used for the "t-sequence" of a codeword;

FIGS. 26A, 26B, and 26C are diagrams showing an example of a codeword vector;

DETAILED DESCRIPTION OF SPECIFIC EMBODIMENTS

A number of specific embodiments of the invention are described here. It will be understood that these embodiments are presented for purposes of illustration and not as limiting the scope of the invention as claimed below.

It is helpful to survey some of the basic hardware and software component types and architecture types used in the illustrative embodiments described here.

Figure 1:
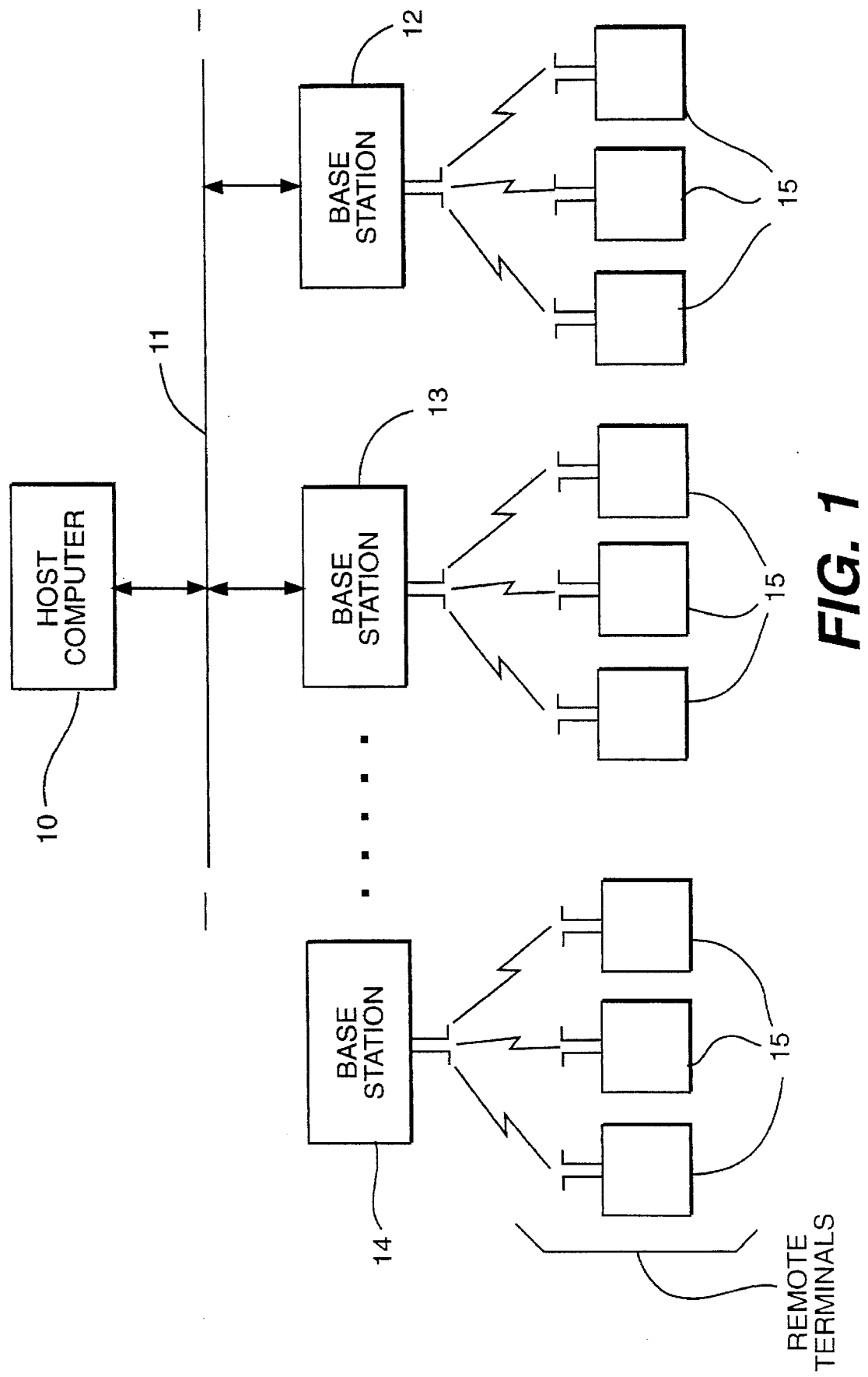
FIG. 1 is an electrical diagram in block form of a communication system featured in certain embodiments of the invention.

Referring to FIG. 1, an exemplary data communications network is shown; the network is described in more detail in the commonly assigned U.S. Pat. No. 5,029,183 issued Jul. 2, 1991. A host processor 10 is connected by a communications link 11 to a number of base stations 12 and 13; other base stations 14 can be coupled to the host through the base stations 12 or 13 by an RF (radio frequency) link. Each one of the base stations 12, 13, or 14 is coupled by an RF link to one or more remote units 15 (sometimes referred to for convenience herein as "terminals" or "readers"). The RF link utilizes a protocol, a timing diagram of which is depicted in FIG. 2, is explained in more detail in the aforementioned patent. Alternatively, the remote units 15 may be connected to the host processor 10 by physical wiring, perhaps via one or more intermediary units 12, 13, or 14.

In one embodiment of the invention, the remote units 15 are laser-scan bar-code readers of the hand-held, battery-operated type, for example, as disclosed in U.S. Pat. Nos. 4,387,297; 4,409,470; or 4,760,248, all commonly assigned with this application to Symbol Technologies, Inc. Various other types of remote terminals may be advantageously employed in a system in accordance with the invention; these remote terminals would ordinarily include data entry facilities such as a keyboard or the like, as well as a display (or printer) for indicating to a user information detected, transmitted, and/or received by the remote unit 15.

In the embodiment used as an illustrative example, there may be from one to 64 of the base stations 12, 13, and 14 (three being shown in the Figure), and up to several hundred of the remote units 15. Of course, the network may be expanded by merely changing the size of address fields and the like in the digital system.

Although hand-held, laser-scan type bar-code readers are mentioned here byway of example, the terminals 15 may also be bar-code readers of the CCD type, and except as may be otherwise mentioned below, may be stationary rather than hand-held. In other embodiments, the device may be of the optical character recognition (OCR) type as well.

Referring to FIG. 3, one typical host-computer architecture is shown. The host processor 10 maintains a database management system (DBMS) employing suitable database management software similar to that commercially available, to which the remote units 15 make entries or inquiries via the base stations 12, 13, and 14.

The host processor 10 has a CPU 20 which may be a microprocessor device of the 80386 type manufactured by Intel Corporation, for example, and the CPU accesses a memory 21 via a main bus 22 to execute instructions. Various I/O processors 23 are used to access peripherals such as a keyboard, a video display, etc., as well as disk storage 24 for the database system and other computer functions. A communications adapter 25 couples the CPU 20 via the main bus 22 to the link 11. This communications link 11 may be of the serial type such as RS-232, or alternatively the link 11 may use one of the available local area network (LAN) type of protocols.

The base stations 12, 13, and 14 each utilize a CPU 30 which accesses a memory 31 via a local bus 32, also seen in FIG. 3. This data processing unit is coupled to the serial link 11 via a communications adapter 33. A printer 33A may be included which may be driven by the CPU 30 via the local bus 32 to print data from the memory 31. An RF transceiver 34 is coupled to the CPU 30 in each base station via the local bus 32 and is connected to an antenna 35 for RF transmission to and reception from the remote units 15. An additional RF transmitter 34A may be used as well as an RF link to and from other base stations, if necessary. An example of a commercially available microprocessor device which may be used as the CPU 30 is a V-25 device manufactured by NEC Corporation, which is the same device used in the remote units 15.

The base stations 12, 13, and 14 are ordinarily located in various rooms or bays of the commercial establishment containing the network of FIG. 1. The RF signal path in this environment is changeable in nature as equipment, forklift trucks, furniture, doors, etc., are moved about, or as the user moves from place to place and carries the hand-held remote unit with him, or as the size of the network is expanded or reduced. There is also a high degree of multipath capability and use in this type of RF link. Thus, the particular one of the base stations communicating at a given time with one of the remote units 15 may change; to this end a "hand-off" protocol may be utilized as described in the issued U.S. patent to change the base station which is designated to handle a remote unit. In this manner, a remote unit 15 has a confirmed link with only one base station at a time, although other base stations may be within range of the remote unit 15.

The base station 12, 13, or 14 is merely an intermediary. The remote unit is communicating with the host processor 10, and the function of a base station is merely to relay data from a remote unit to the host computer or vice versa. In some installations there may be only one base station, in which case the communications link 11 may be a direct connection via an RS-232 serial port and cable or, if the building is such that the base station can be mounted at the same location as the host computer, the link 11 may be replaced by a parallel bus-to-bus interface, in which case the base station and host computer may be considered a single unit.

In some of the implementations discussed below, a base station 12, 13, 14 will preferably be transportable, e.g., mounted on a suitable cart in a conventional manner. Suitable power and communications jacks may be provided, e.g., at strategic points in flooring, to provide electrical power as well as a link between the base station and the host computer 10. Alternatively, such a link may be provided as an RF link as discussed above.

Referring to FIG. 4, each remote unit 15 in the example embodiment is a data terminal (e.g., a hand-held bar code reader) having a CPU 40 executing instructions from a program and data memory 41 which is coupled to the CPU via a local bus 42. A peripheral bar code data acquisition device 43 is coupled to the CPU via the bus 42 and is used to detect and/or convert data from the bar code scanning section to be stored in the memory 41 and processed by the CPU 40; other control devices may interface with a keyboard and display. An RF transceiver 44 is coupled to and controlled by the CPU via the bus 42, and transmits the coded RF signal through an antenna 45 or detects and converts RF received by the antenna, according to a protocol. In an alternative embodiment, the terminal unit 15 may be connected with the host computer 10 via a conventional electrical or optical cable. Usually the remote unit 15 has a manual data entry device, such as a keyboard 48, and a visual display 49, such as an LCD device.

Figure 5:
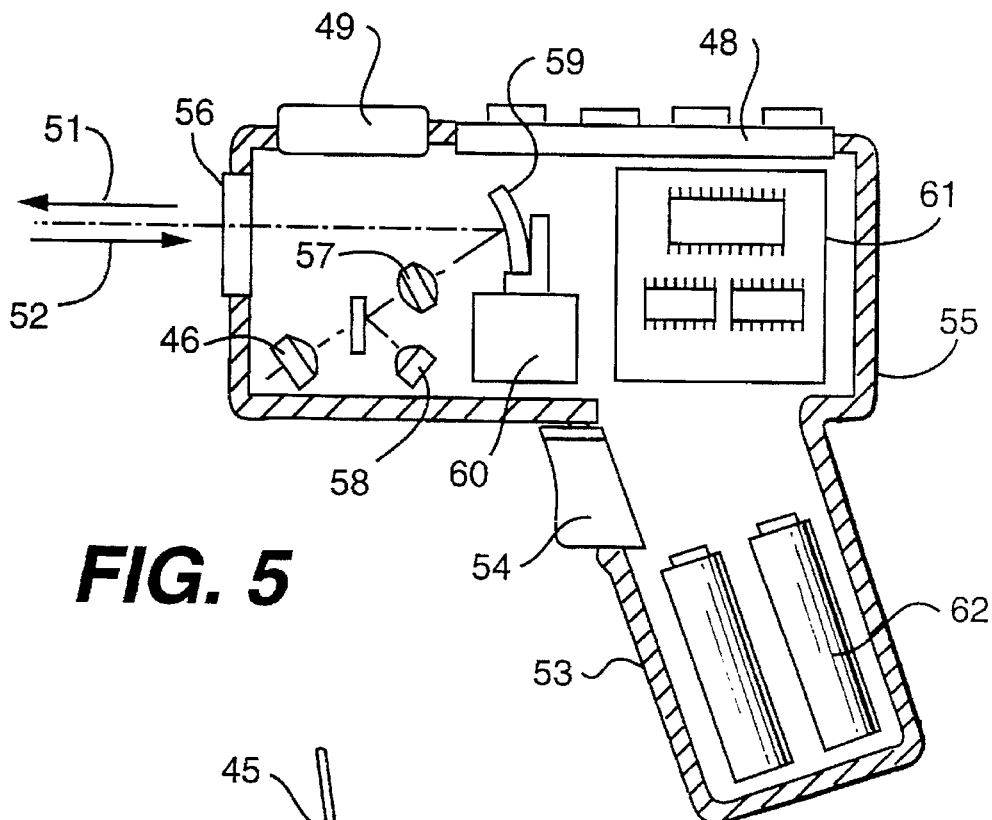
FIG. 5 is a sectional view of a hand-held bar code scanner unit which may be used as a remote terminal in certain embodiments of the invention.

Although other data terminal units 15 may be advantageously employed in a system having features of the invention, a hand-held, laser-scan, bar code reader unit as illustrated in FIG. 5 is an example of a remote unit particularly suited for use in the system of FIG. 1. This hand-held device of FIG. 5 is generally of the style disclosed in U.S. Pat. Nos. 4,760,248, 4,806,742, or 4,816,660, commonly assigned with this application to Symbol Technologies, Inc., and also similar to the configuration of a bar code reader commercially available as part number LS 8100II from Symbol Technologies. Alternatively, or in addition, features of U.S. Pat. Nos. 4,409,470 or 4,816,661 may be employed in constructing the bar code reader 15 of FIG. 4. The aforementioned patents are incorporated herein by reference.

Referring to FIG. 5, an outgoing light beam 51 is generated in the reader 15, usually as a laser diode or the like, and directed to impinge on a bar code symbol a few inches from the front of the reader unit. The outgoing beam 51 is scanned in a fixed linear pattern, and the user positions the hand-held unit so this scan pattern traverses the bar code symbol to be read. Reflected light 52 from the symbol is detected by a light-responsive device 46 in the reader unit, producing serial electrical signals to be processed for identifying the bar code. The reader unit 15 is a gun-shaped device having a pistol grip type of handle 53, and a movable trigger 54 is employed to allow the user to activate the light beam 51 and detector circuitry when pointed at the symbol to be read, thereby saving battery life if the unit is self-powered. A lightweight plastic housing 55 contains the laser light source, the detector 46, the optics and signal processing circuitry, and the CPU 40 and RF transceiver 44 of FIG. 4, as well as a battery. A light transmissive window 56 in the front end of the housing 55 allows the outgoing light beam 51 to exit and the incoming reflected light 52 to enter.

Also seen in FIG. 5 in connection with the remote unit 15 are a lens 57 used to collimate and focus the scanned beam into the bar code symbol at the proper depth of field; a light source 58 such as a semiconductor diode; and an oscillating mirror attached to a scanning motor 60 which is activated when the trigger 54 is pulled. The electronic components of FIG. 3 are mounted on one or more small circuit boards 61 within the housing 55 of FIG. 4, and batteries 62 are enclosed to provide a self-contained portable unit. The antenna 45 may be printed on one of the circuit boards 61.

Figure 5A:
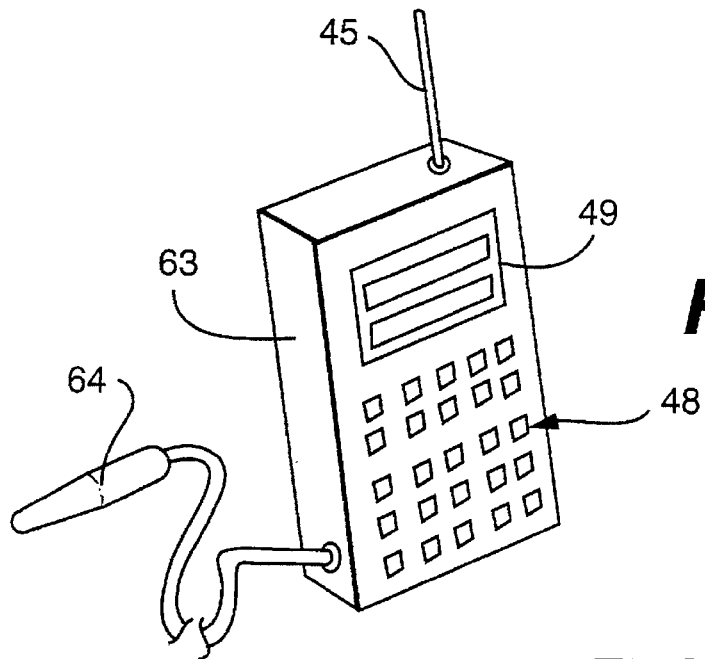
FIG. 5A is a pictorial view of another type of bar code reader which may be used as a remote terminal instead of or in addition to the scanner of FIG. 5.

Referring to FIG. 5A, another embodiment of a remote terminal 15 is illustrated wherein a wand-type bar code reader is employed instead of the laser scanner of FIG. 5. The device of FIG. 5A is similar to a commercially available portable radio terminal sold under the product name "MSI PRT" by MSI Data Corporation, of Costa Mesa, Calif., a subsidiary of Symbol Technologies, Inc., which is the assignee of this application. The keyboard 48 and display 49 are mounted at the face of a hand-held housing 63, and the light source 58 (in this case an LED, for example) and light detector 46 (not seen in FIG. 5A) are mounted within a pencil-shaped wand 64 connected to the housing 63 by a cable. The person using the device of FIG. 5A holds the housing 63 in one hand and the wand 64 in the other, and moves the wand 64 across the bar code symbol, in contact with the symbol, instead of holding the unit steady (spaced from the symbol) and relying upon the oscillating mirror to generate the scan of the symbol as is the case for the embodiment shown in FIG. 5. Otherwise, the device of FIG. 5A contains the circuitry of FIG. 4, and the RF link operates in the same way.

FIGS. 9A, 9B, 10–11, 14A, 14B, and 15–16 set forth logic diagrams of certain database management functions and the like performed by the illustrative embodiments. Those skilled in the art will appreciate that the actual optimum organization and structure of software to control various hardware components in accordance with the invention will depend greatly on the characteristics of the specific hardware with which the invention is implemented, and likewise that functions shown as implemented in software can equivalently be implemented in, e.g., discrete logic hardware and vice versa. By and large, the logic diagrams do not set forth common input/output (I/O) routines, error trapping and/or handling, boundary condition detection, and similar conventional functions.

Figure 7:
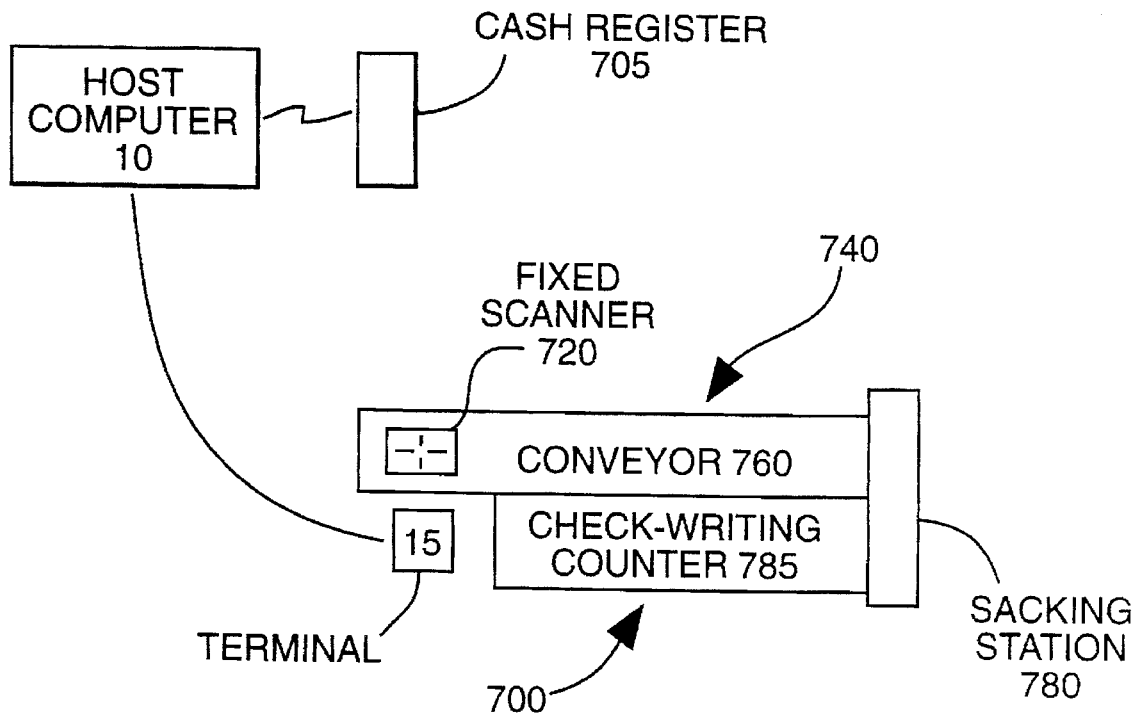
FIG. 7 is a block diagram of a plan view of an improved, retrofittable checkout lane in accordance with the invention.

Referring to FIG. 7, in one embodiment of an improved checkout system a primary checkout station 700 is designed (or remodeled if necessary) to include an auxiliary checker well 790, which is configured to allow a human auxiliary checker to stand (or sit) on the other side of a fixed scanner 720. Many existing checkout lanes 700 already include space in which an auxiliary checker could stand in this manner; no significant remodeling of such lanes should be necessary in this respect. Such an auxiliary checker may be equipped as needed with an auxiliary checkout terminal such as a remote terminal 15, e.g., the portable terminal described above.

The terminal 15 is linked with a checkout computer (discussed below), which correlates scanned bar-code data with item price and item description information, by a suitable connection. In a particularly convenient arrangement, a cash register 705 includes a base station 12, 13, or 14 as described above, thereby allowing the cash register 705 to serve as the link between the terminal 15 and a host computer 10. In such an arrangement, item price data, brief item descriptions, and similar lookup table information can be downloaded periodically from the host computer 10 to the cash register 705 for storage in a memory 31 of the base station or in disk storage (not shown) of the base station. The base station and its CPU 30 thus serve as the checkout computer.

Alternatively, a base station 12, 13, or 14 may be strategically located elsewhere in the store. In another alternative, the terminal 15 may be plugged into a suitable jack (not shown) appropriately located in or near the checkout lane 700 to connect to the host computer 10 via a conventional cabling arrangement, using amplifiers and other conventional equipment as necessary; in such an arrangement, the host computer may function as the checkout computer.

The auxiliary checker may thus remove packages from a shopping cart 710 and scan them with the terminal 15, thereby relaying two-dimensional bar-code data from the scanned items to the checkout computer, at essentially the same time as the cashier is removing packages and dragging them across a fixed scanner 720. In this way, the speed of processing customers through the checkout lane 700 is increased.

This checkout system presents distinct advantages over conventional systems. It handles peak period increases in customer traffic by activating terminals 15 instead of additional fixed scanners 720. During non-peak periods, these terminals 15 can be put to other uses such as inventory control, e.g., by selecting different preprogrammed functions using the terminal's keyboard 48 (or alternatively by downloading new programming from, e.g., a program storage device such as disk storage 24 at a base station or a host computer 10 via the RF link), thus avoiding the economic waste of idling the fixed scanners 720 which are no longer needed and committing the floor space for such scanners during such periods. Inasmuch as the customer throughput of a given checkout lane 700 during peak periods is increased, the square footage in a store that must be dedicated to the checkout function is reduced, thus freeing up that square footage for additional display space or other uses. In any given store, existing conventional checkout lanes 700 that are not converted to other uses can be retrofitted without the need to replace the fixed scanner 720; if the terminals 15 are linked to the host computer 10 via an RF link as described above, the checkout lane 700 need not be significantly modified at all (except perhaps to provide more room for standby persons to work).

In an improved checkout and payment system for a grocery store or similar high-volume establishment, the checkout function of taking inventory of the customer's purchase is separated from the function of receiving the customer's payment.

Figure 8B:
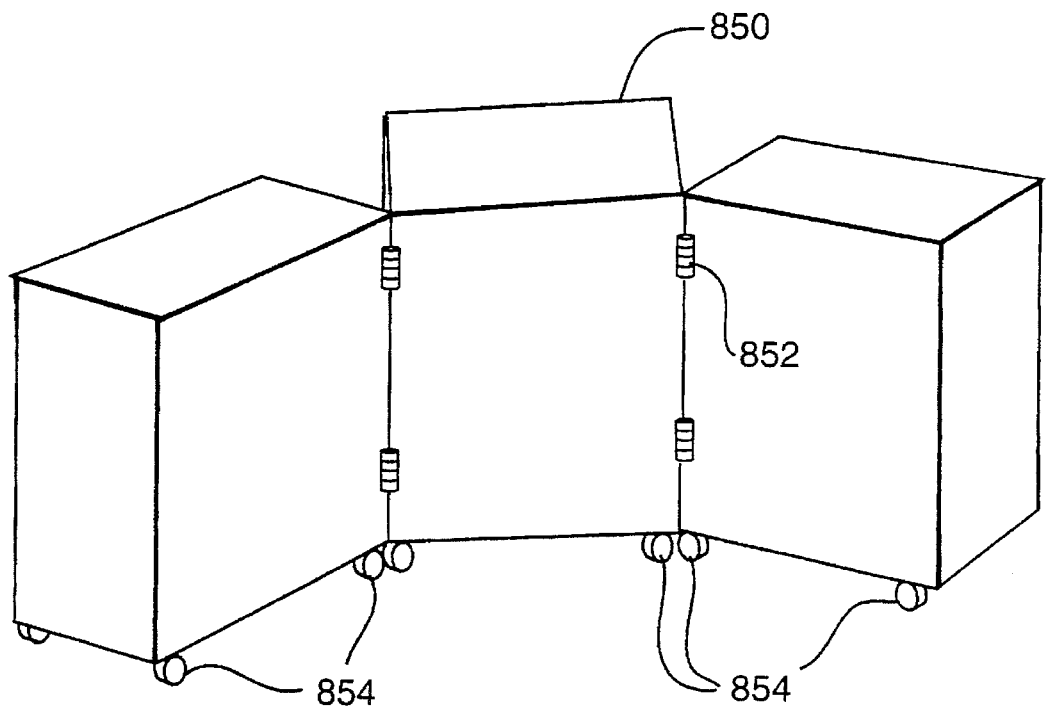
FIG. 8B is a perspective view of a portable counters that may be used in the present invention.
Figure 8A:
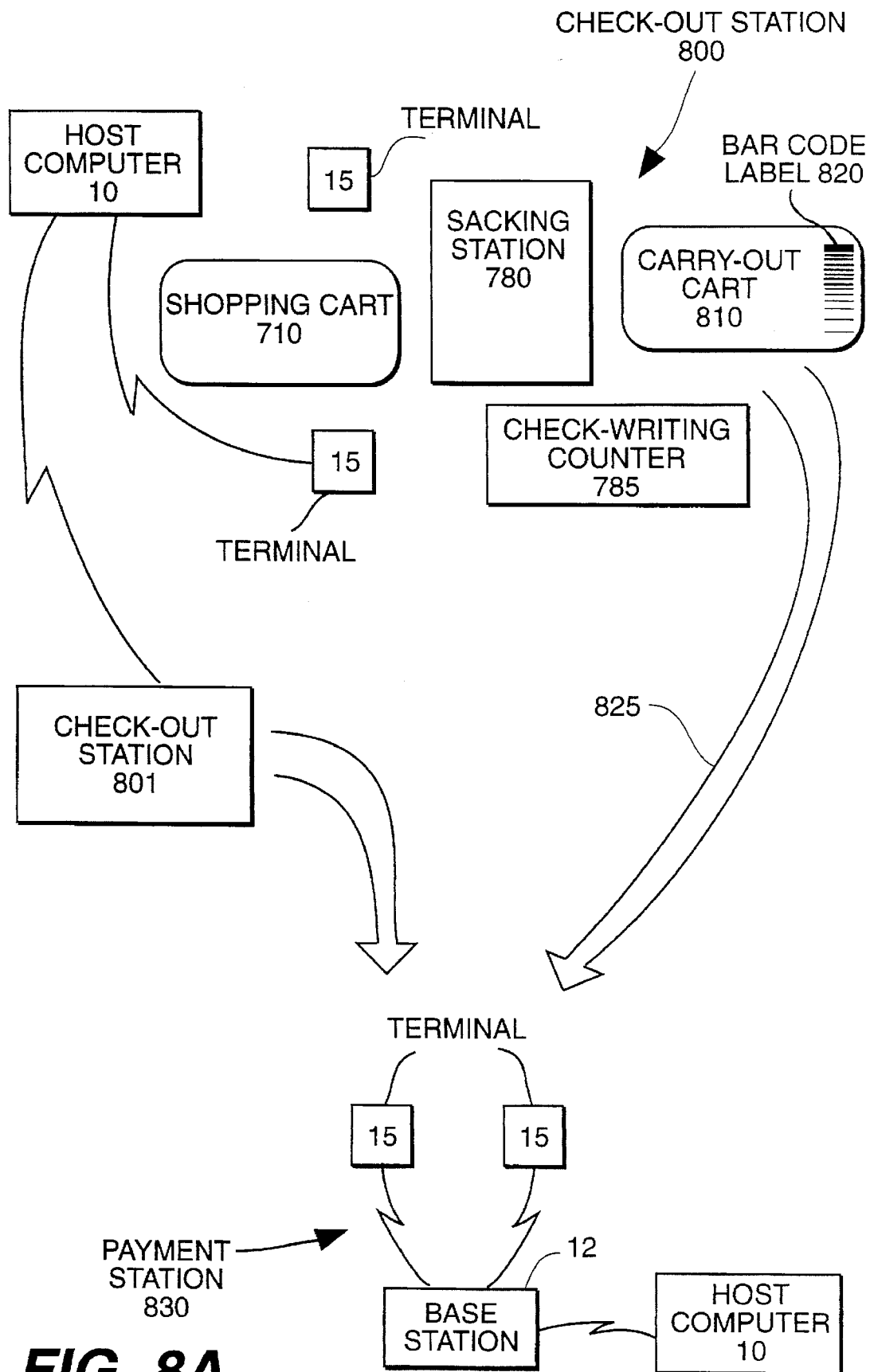
FIG. 8A is a block diagram, in plan view, of a transportable checkout station and payment station in accordance with the invention.

Referring to FIG. 8A, a customer takes his purchases to a primary checkout station 800, frequently with the purchases being carried in a shopping cart 710. The checkout station 800 may include a base station 12, 13, or 14, preferably transportable. A second primary checkout station 801 is shown in outline only.

Each item in the customer's shopping cart 710 is removed and machine-read by one or more checkers or, if unreadable, is manually recorded via a keyboard or other conventional means. One or more terminals 15 of the type discussed above may be used for both reading and manual recording. Information obtained by reading bar codes or by manual keyboard input is processed and stored in a transaction data file, e.g., by the base station 12, 13, 14, or by the host computer 10.

The purchases are sacked at a sacking station 780. If the customer desires, he or she may write a check at a check-writing station 785. The sacking station 80 and check-writing station 785 may comprise simple counters, which may be designed in any convenient form for easy portability and storage in a manner known to persons of ordinary skill. For example, as shown in outline form in FIG. 8B, the sacking station 780 and check-writing station 785 may comprise foldable counters 850 that open for use on lockable hinges 852 and, when folded, may be easily moved on lockable wheels or casters 854.

With the benefit of this disclosure it will be apparent that the entire checkout station 800 may thus be readily taken down, moved, stored, and set up again when needed. During non-peak periods, one or more checkout stations 800 may be taken down, thus freeing up space and equipment for other uses.

Referring again to FIG. 8A, the customer's purchases are bagged at the sacking station 780 and placed in a carry-out cart 810 in a conventional manner. The carry-out cart may of course be one and the same as the shopping cart 710.

Figure 9A:
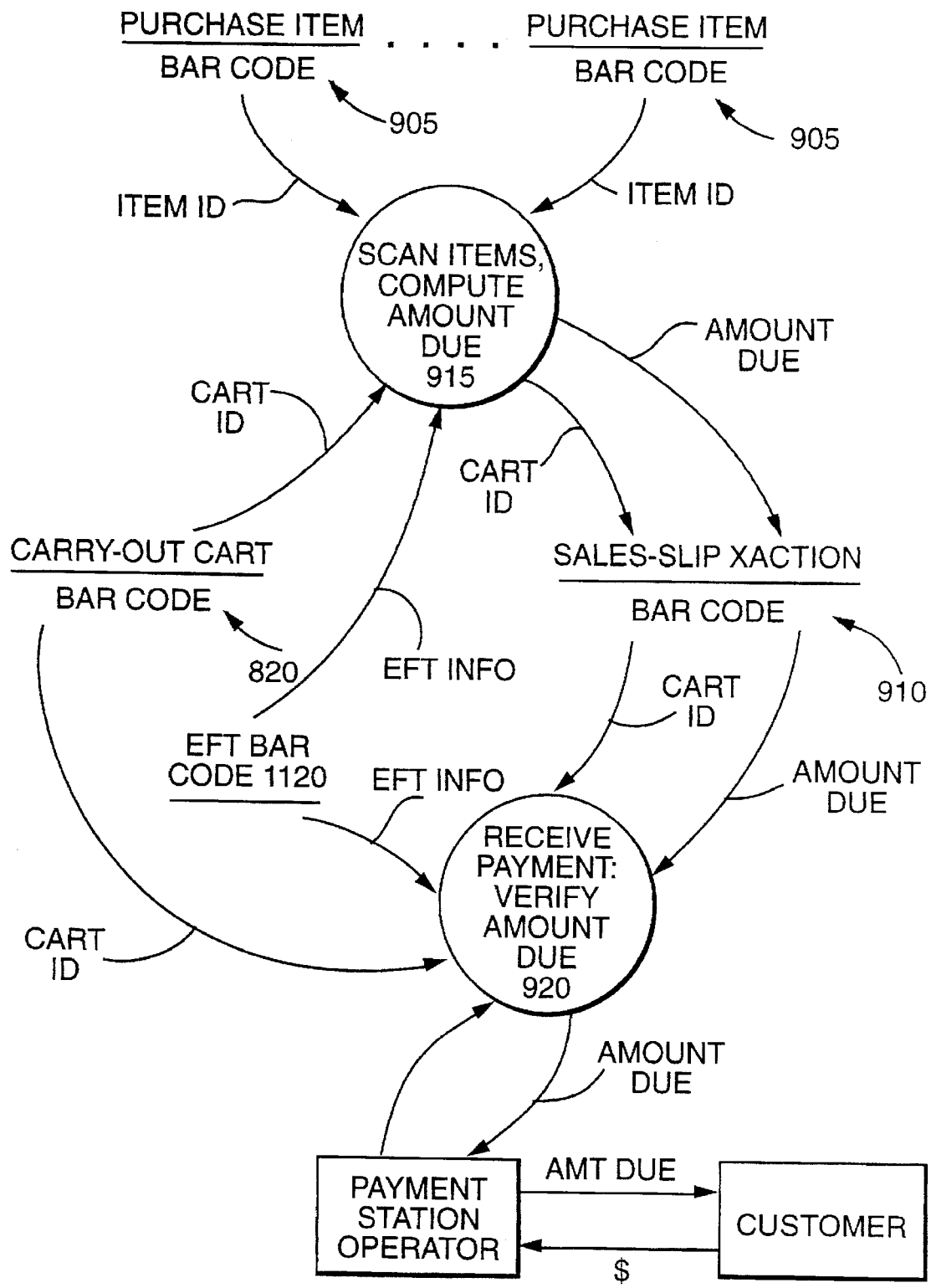
FIGS. 9A and 9B are logic diagrams of certain functions performed by the stations.

Referring also to FIG. 9A, to enable the antifraud measures discussed below, at a convenient point in the checkout process (e.g., at the beginning) a checker reads a bar code 820 affixed to and identifying the carry-out cart 810. Each purchased item's bar code 905 is likewise read. When all of a given customer's purchases are thus recorded at the checkout station 800 (see FIG. 8A), a checker so indicates, e.g., using a suitable key 48 on the terminal 15. As noted above, additional checkers may be employed at any given checkout station 800 on an as-needed basis to handle peak traffic periods.

In one embodiment, a human-readable itemized sales slip (not shown) is printed at the checkout station 800 using a printer capable of printing bar codes (e.g., a printer 33 comprising part of a base station 12, 13, or 14) in the conventional manner in much the same way as an adding machine tape. When the total amount due has been computed, a sales slip transaction bar code 910 (see FIG. 9A) is generated via process 915, e.g., by a base station 12, and printed on the sales slip. The transaction bar code 910 includes the total amount due as well as optional security-related information such as the date and time, the identity of the checkout station 800, the identity of the customer's carry-out cart, and the like.

As shown by arrows 825 in FIG. 8A, the customer takes his or her bagged purchases, the sales slip, and the amount due to a payment station 830. If he so desires (e.g., if a check-writing station 785 is not provided at the particular checkout station 800), he may stop at a check-writing station 840 to write a check to avoid delaying others at the payment station 830.

At the payment station 830, the station operator uses a terminal 15 to read the transaction bar code 910 from the sales slip and thereby determine (a) the carry-out cart identification data previously encoded into the bar code 910, and (b) the amount due. The terminal 15 is also used to read the bar code 820 from the carry-out cart 810. The CPU 40 of the terminal 15 may compare the carry-out cart identification data from the cart bar code 820 and the transaction bar code 910 to verify that they match, as shown at process 920 in FIG. 9A. This can be useful in reducing the chance that an unscrupulous customer might, for example, bring with him an old sales slip for a previous low-dollar transaction and fraudulently give it to the payment station operator in lieu of the actual receipt for the current, comparatively high-dollar transaction. If not detected, such a customer could "spoof" the payment station operator into allowing the customer to leave with a large purchase while paying less than the amount owed.

In FIG. 8A, the payment station 830 is shown as receiving customers from both checkout stations 800 and 801. Depending on customer traffic flow, additional payment station operators equipped with terminals 15 can be assigned to the payment station 830. Alternatively, or in addition, extra payment stations can be set up to handle increased traffic. The payment stations may conveniently comprise one or more counters 850 as shown in FIG. 8B.

Figure 9B:
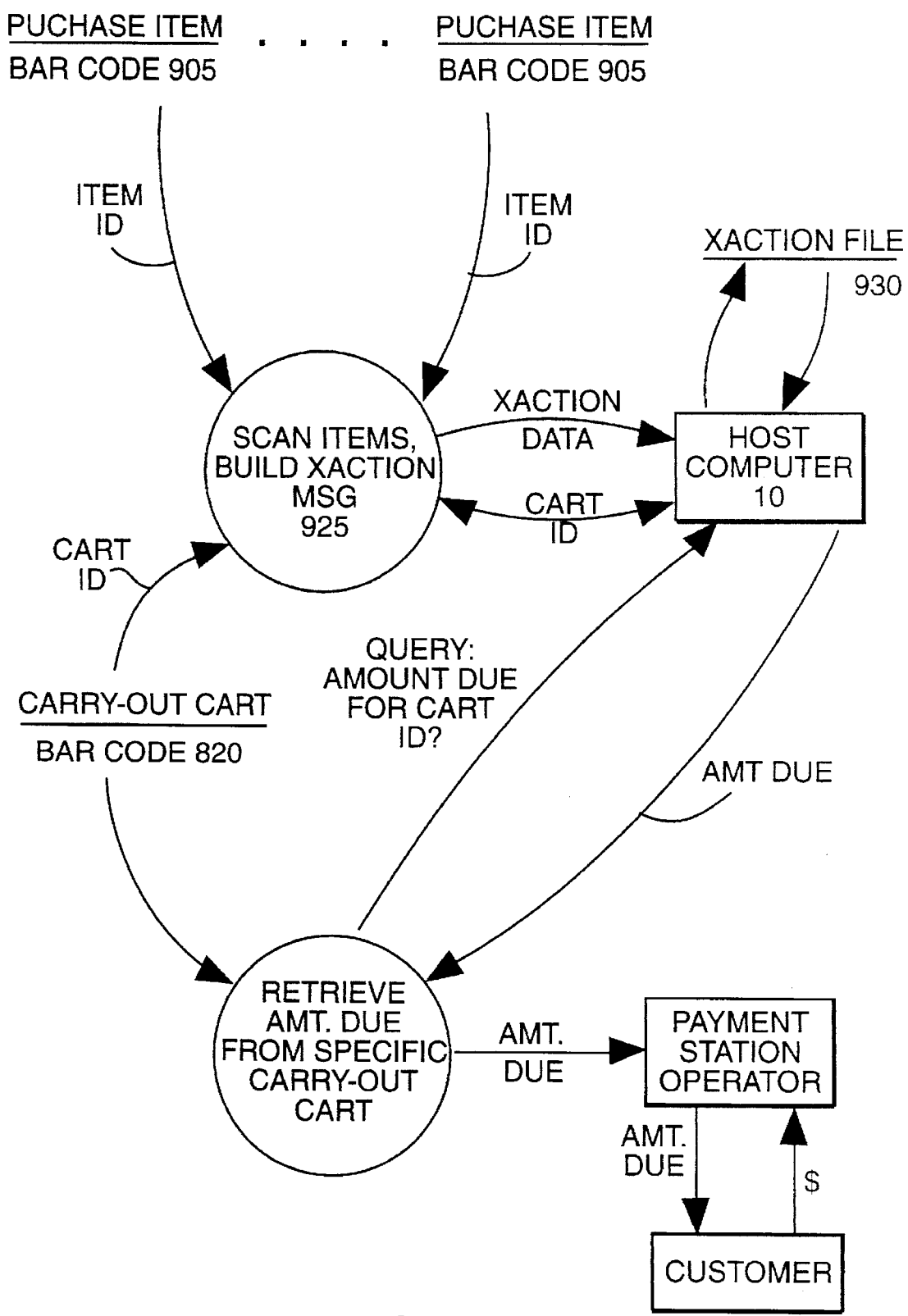

If it is not desired to provide the checkout station 800 with a printer, the bar code 820 on the carry-out cart may be used as a "claim check" to identify the transaction. Referring to FIG. 9B, identification data encoded into the carry-out cart bar code 820 and the amount due may be saved at process 925 to a transaction data file 930 (e.g., by the host computer 10) for later retrieval by the operator of the payment station 830 using a terminal 15. The amount due may be displayed on the display 49 of the terminal 15 so that the payment station operator can determine whether the amount tendered matches the amount due.

A checkout station 800 of the kind described above, with or without a payment station 830, or alternatively a checkout lane 700, may be utilized in conjunction with an electronic funds transfer (EFT) system. Those of ordinary skill having the benefit of this disclosure will recognize that in this context, an EFT system, generally speaking, permits a customer at a store or other establishment to transmit an electronic signal to the customer's bank (or, e.g., to the customer's credit card issuer, or to another institution at which the customer has an account), directing that the customer's bank account be debited for the amount of the customer's transaction at the store, and that the debited amount be transferred into the store's account at the same or another bank (or other institution).

Figure 10:
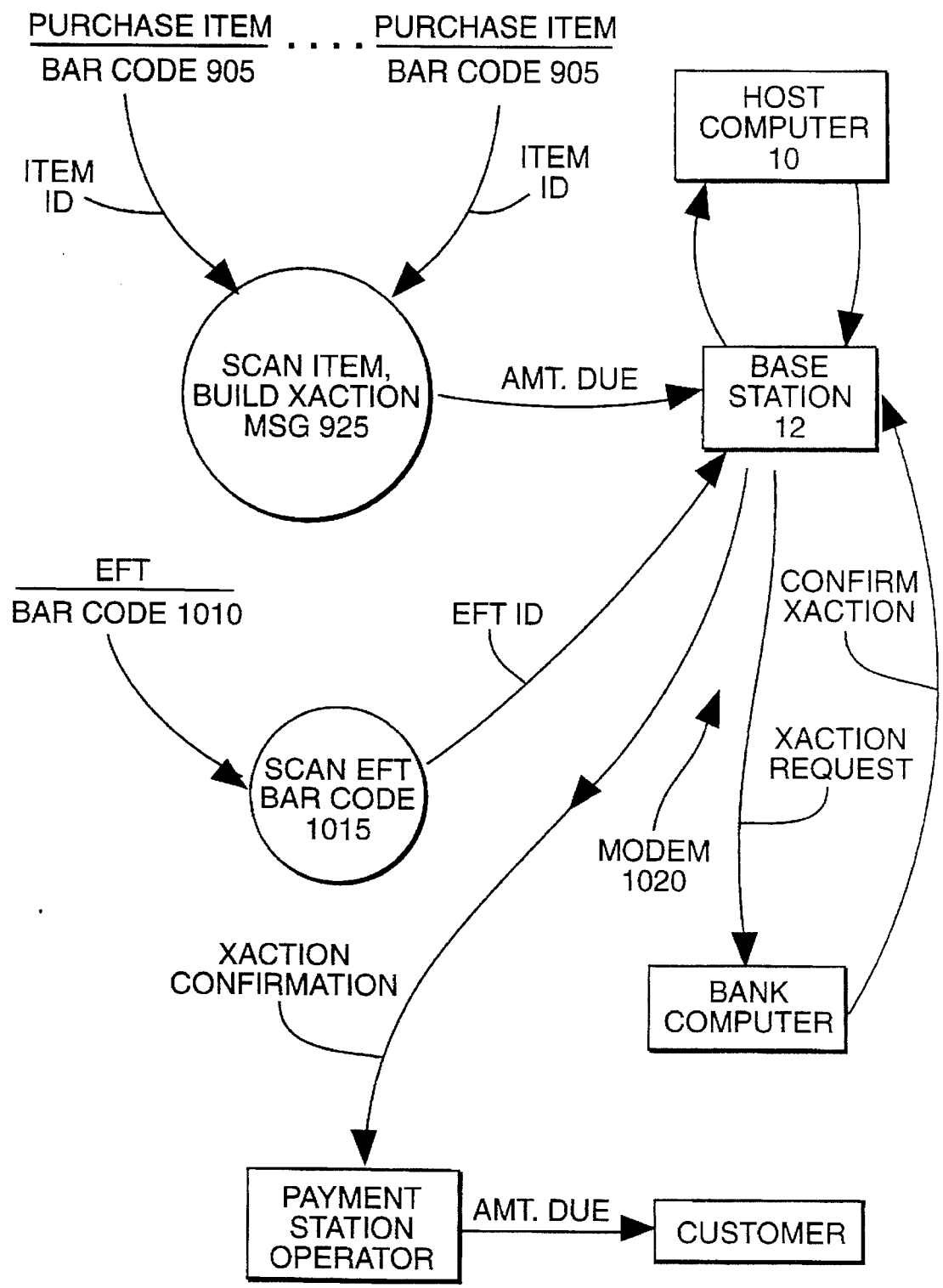
FIG. 10 is a logic diagram of a system having provision for an electronics fund transfer according to an alternate embodiment of the present invention.

Referring to FIG. 10, in one embodiment, a customer applies to the store for an EFT card having printed thereon an identification code encoded in an EFT bar code 1010. In making the application, the customer supplies the store with bank and account identification data. The host computer 10 maintains a customer data file, e.g., in the disk storage 24, that includes the identification code as well as the bank and account identification data.

Such a card could alternatively be issued by the customer's bank itself, either as a card or preprinted on the customer's checks, or could be issued by a third-party organization. In another alternative, a credit card number could be encoded in the bar code. Instead of being printed on an EFT card, such an identification code may be printed in a bar code label and given to the customer to apply to an existing record device, e.g., an already existing credit card, as has been done by some video rental stores to identify their customers.

At the checkout station 800 (or alternatively at the payment station 830), the customer presents the EFT card to the station operator. Using a terminal 15, the station operator reads the EFT bar code 1010 (and, if necessary, the claim check bar code 820) as illustrated by process 1015, and sends a signal to, e.g., the host computer 10 (or simply to the base station 12, 13, or 14 as illustrated in FIG. 10) to associate the EFT identification code with the specific transaction. If desired, the programming of the system may be designed to require the customer to input a secret personal identification number (PIN) code using the keyboard 48 of the terminal 15 to confirm his or her authorization to use the EFT card.

The base station 12 queries the host computer 10 to retrieve the bank information necessary for an electronic funds transaction. If this information is already encoded in the EFT bar code 1010, this query may not be necessary. The base station builds an EFT transaction request and transmits it to the customer's bank or to a suitable service bureau, e.g., via a modem 1020 or alternatively bypassing a transmittal request to the host computer 10. If the base station receives a reply that the EFT request has been approved by the customer's bank, it transmits a signal to that effect to the terminal 15 for display on the display 49. If desired, a printed receipt may be generated using the printer 33A.

Referring again now to FIG. 8A, if desired, the EFT bar code 1010 may be scanned at the checkout station 800. If customer traffic is heavy and it is desirable to get the customer out of the checkout station 800, the customer may be asked to proceed to the payment station 830 where he may enter his PIN, wait for bank approval of the EFT request and obtain his printed receipt. Alternatively, if a delay at the checkout station 800 is acceptable and the checkout station 800 is equipped with a base station 12 having a printer 33A, the customer may input his PIN and receive his printed receipt at the checkout station in lieu of proceeding to the payment station 830.

As still another alternative, the EFT card information and the fact that an EFT request had been submitted via the host computer 10 may be encoded in the transaction bar code printed on the sales slip at the checkout station 800. Then, at the payment station 830, the station operator may use the terminal 15 to query the host computer 10 whether the EFT request was approved by the customer's bank.

If desired, one or more checkout stations 800 may be designated for EFT card transactions only; traffic flow out of such stations could be set up so that their customers could exit the store directly, bypassing the payment station 830. The availability of rapid, specially privileged checkout would encourage customers to obtain and use EFT cards as a payment medium.

In an alternative embodiment, the EFT card could be used merely as a form of identification to speed up the store's decision whether to accept a customer's check. The EFT card bar code 1010 may be scanned to obtain the customer's identification (e.g., driver's license number), which may then be transmitted in a conventional manner to a service bureau computer system or other system to ascertain whether the customer has been identified as a bad risk.

If the EFT card takes the form of a preprinted bar code label on the customer's blank checks, the printer 33A may be used to print a cancellation mark on the check immediately upon completion of the EFT transaction (inasmuch as there is then no need for the physical check to be processed and later returned to the customer). The payment station operator may then return the check to the customer for his or her records. For security purposes, the EFT request preferably should include the check number or similar identifying information so that an inadvertent or fraudulent attempt to process the check again will be less likely to succeed. Such an implementation permits essentially "real-time" processing of checks, facilitated by the customer's contemporaneous entry of his PIN code.

Customer checks without bank account bar codes nevertheless will usually carry a bank identification and account number imprinted in magnetic ink (normally at the bottom of the check). A similar EFT request can be generated using this data, entered either manually by a human operator reading the magnetic ink characters or by a conventional magnetic-ink scanner such as those found in banks. Once the EFT request is approved by the customer's bank, the check can be cancelled and returned to the customer.

A payment station 830 of the kind described above (or alternatively a checkout station 800 or a checkout lane 700) may be utilized in conjunction with an electronic data interchange (EDI) system for quicker processing of customers' paper checks, thus advantageously speeding up the store's receipt of funds from customers' banks.

Figure 11:
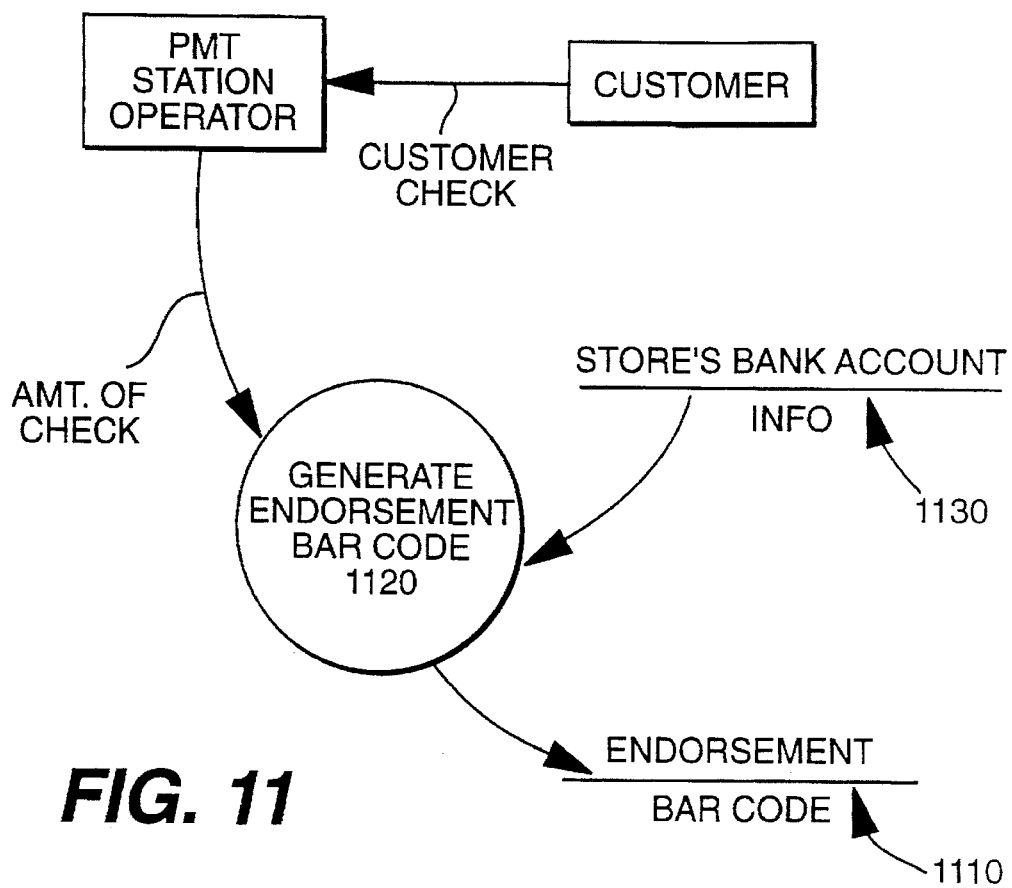
FIG. 11 is a logic diagram of an alternate embodiment of a payment system of the present invention.

Referring to FIG. 11, in such an embodiment a printer 33A of a base station 12, 13, or 14 at a payment station 830 is of a kind suitable for printing two-dimensional bar code labels. The payment station operator, receiving a paper check from a customer, aligns the check under the printing mechanism of the printer 33A. On a signal from the station operator, the printer 33A prints an endorsement bar code 1110 as illustrated at process 1120. This bar code may include some or all information needed to effectuate a transfer of funds from the customer's bank account to the store's bank account. Such information may include the amount of the check as entered by the payment station operator, as well as identification data concerning the store's bank and account number retrieved from a file 1130 stored, e.g., in a memory (not shown) at a base station 12.

The endorsement bar code 1110 printed on a check (e.g., on the back of a check) may thus replace a conventional endorsement stamp on the check. For greater convenience, the customer's check may include a preprinted bar code label containing his own bank identification number and account number in the same manner as is commonly done with magnetically readable inks.

An improved processing system for store inventory and other goods involves the use of a terminal 15 and a host computer 10 for more effective processing.

Figure 12:
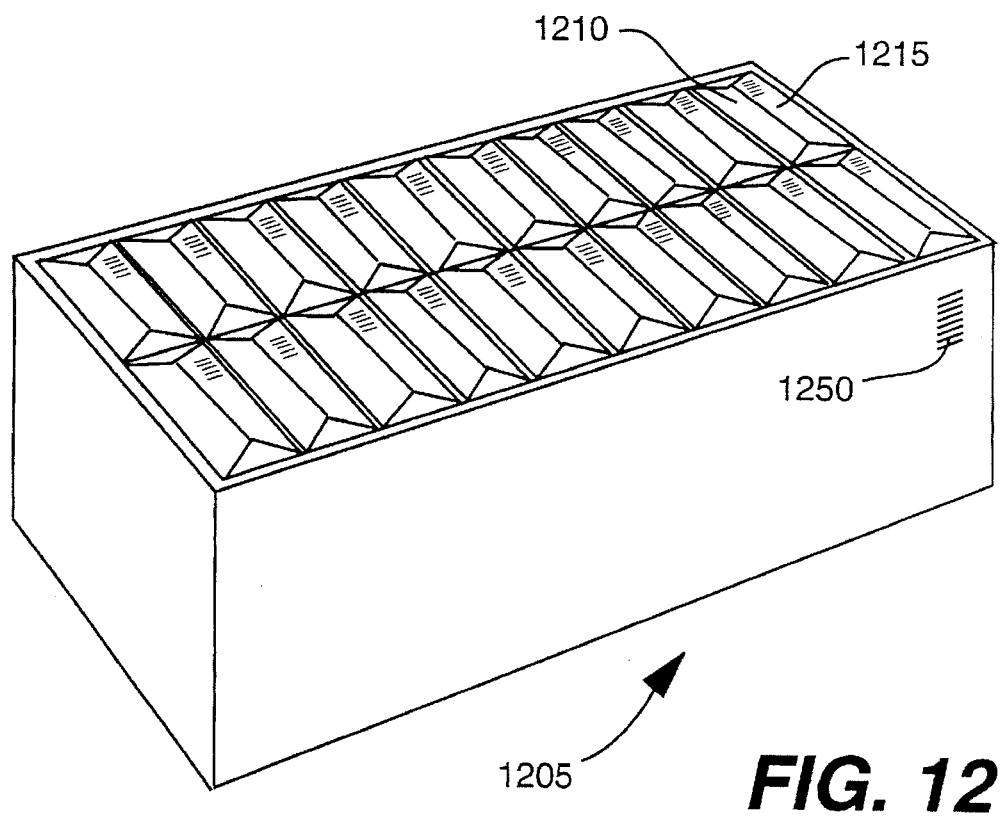
FIG. 12 illustrates a carton of cereal boxes with a 2-D bar code applied thereto.
Figure 13A:
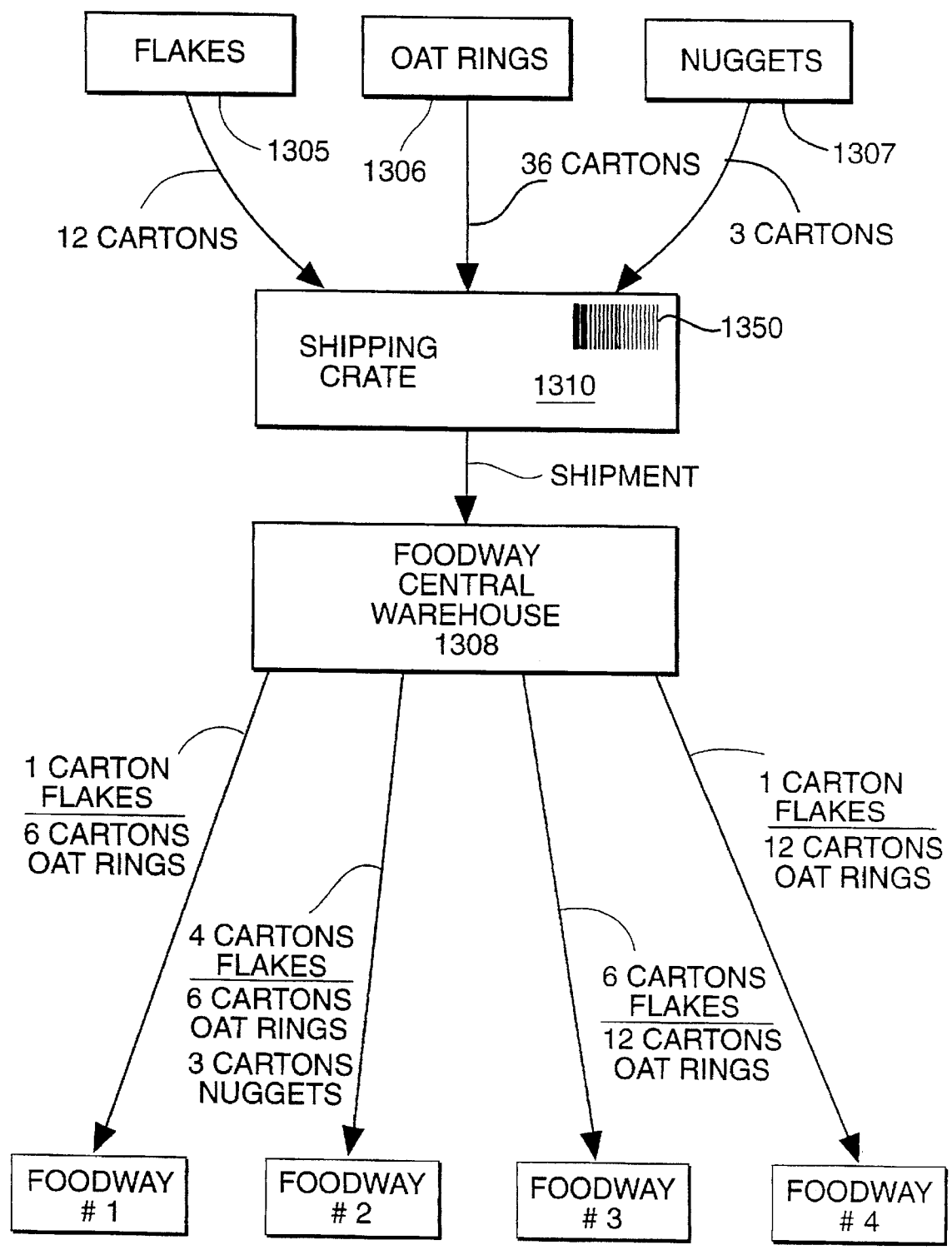
FIG. 13A is a block diagram illustrating distribution of inventory in the system of the present invention.

For purposes of convenient illustration, the improved processing system is described in connection with the movement of items from an origination point to a destination point via a receiving/redistribution point. Consider a hypothetical breakfast cereal product line that is produced at a "CerealCo" company factory and is shipped to, e.g., a retail grocery store for eventual sale. Assume for this purpose that CerealCo cereals come in three types, referred to here as flakes, oat rings, and nuggets, and that they are shipped in cartons containing a dozen cereal boxes per carton. As shown in FIGS. 12 and 13A, shipment-ready cartons 1205 of a dozen cereal boxes 1210 each are stored, e.g., in warehouse bays 1305, 1306, 1307 in the CerealCo factory or other convenient place.

During packaging (for example), an identifying two-dimensional bar code 1215 is conventionally applied to each cereal box by printing or other suitable means. The two-dimensional bar code preferably contains identifying information such as one or more of: the type of cereal, the cereal lot number, and CerealCo's name and address. Similarly, an identifying two-dimensional bar code 1250 is applied to each carton 1205 of cereal boxes 1210.

Referring to FIG. 13A, assume a hypothetical situation as follows. One of CerealCo's customers is the Foodway Grocery Company which operates retail outlets #1 through #4 in a city. All Foodway stores in the city are served by a common warehouse and inventory receiving point 1308.

Foodway places an order with CerealCo for twelve cartons of flakes cereal boxes, thirty-six cartons of oat rings cereal boxes, and three cartons of nuggets cereal boxes. Foodway intends to redistribute these cereal boxes, once received at the receiving point, to its stores as follows:

|  | Flakes | Oat Rings | Nuggets |
| --- | --- | --- | --- |
| Store #1 | 1 ctn | 6 ctn |  |
| Store #2 | 4 ctn | 6 ctn | 3 ctn |

-continued

|          | Flakes | Oat Rings | Nuggets |
|----------|--------|-----------|---------|
| Store #3 | 6 ctn  | 12 ctn    |         |
| Store #4 | 1 ctn  | 12 ctn    |         |
| TOTAL    | 12 ctn | 36 ctn    | 3 ctn   |

Figure 13B:
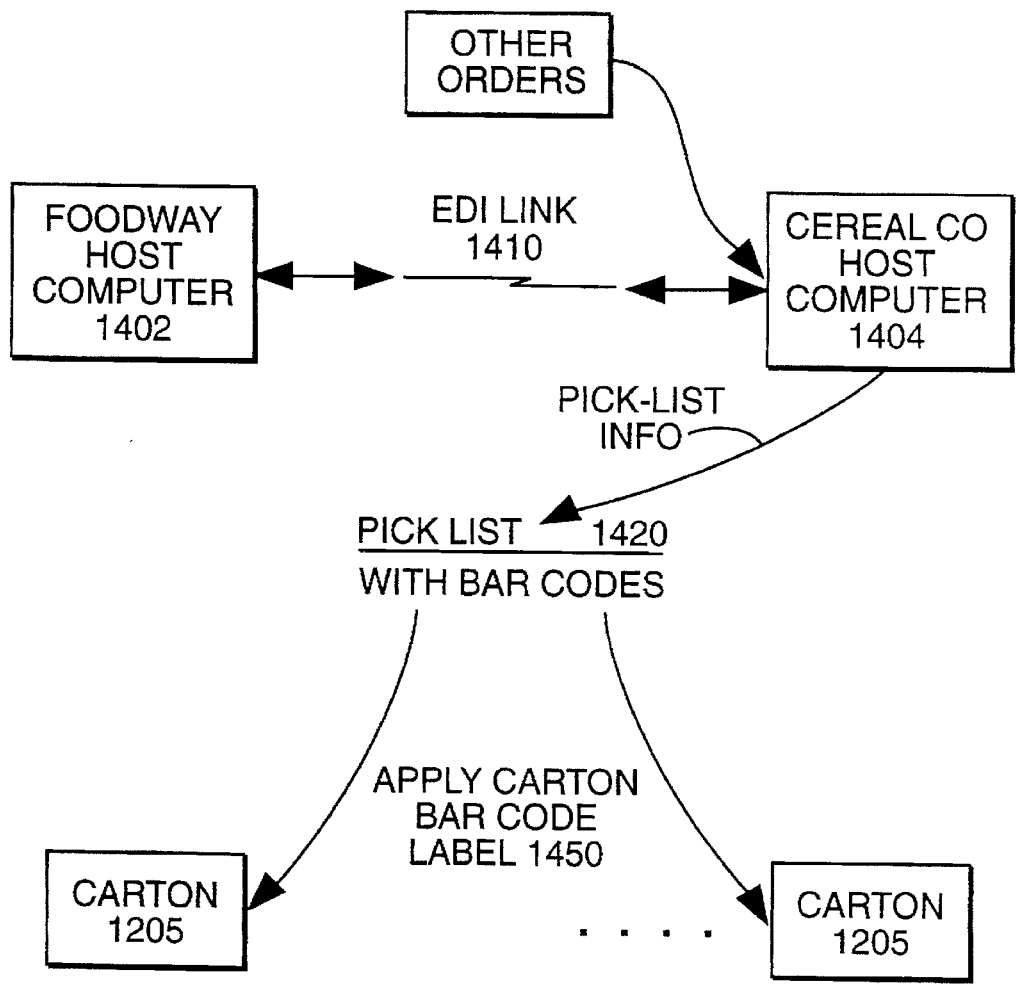
FIG. 13B is a block diagram illustrating flow of information in an inventory system of the present invention.

Referring to FIG. 13B, the Foodway order, including addressing information for the destination stores, is transmitted to CerealCo in any convenient way, e.g., by telephone, telecopy, or an electronic data interchange (EDI) technique. The order is conventionally input into a host computer 1404, e.g., via a scanner, a keyboard, or directly from a Foodway computer 1402 via an EDI link 1410.

The CerealCo host computer 1404 consolidates the Foodway order with other orders and prints a special pick list form 1420, e.g., by transmitting the appropriate data to a base station 12 for printing on a printer 33A. The pick-list form 1420 is printed on blank stock that includes a series of blank peel-off labels (for use as bar code labels as discussed below).

As printed, the pick-list form 1420 includes appropriate order-filling information, e.g., the specific locations of warehouse bays 1305, 1306, 1307 from which cartons 1205 of cereal boxes 1210 are to be drawn to fill the orders. The pick-list form 1420 as printed also includes bar-coded destination address labels 1450, printed on the aforementioned blank labels, that are applied to cartons 1205 of cereal boxes 1210 stored at the locations specified on the pick-list form 1420. The pick-list form 1420 thus serves as a machine-readable, destination-information storage device comprising transferable machine-readable, destination-information modules. The labels 1450 may be applied manually or with suitable automatic means. The destination information encoded in the address labels 1250 may be as detailed as desired, perhaps even including the shelf locations at which the cereal boxes in question are displayed at various Foodway stores. This information may be supplied by Foodway, e.g., via the EDI link 1410.

As shown in FIG. 13A, the now-labeled cartons 1205 of cereal boxes 1210 are transported by suitable means (not shown) to an order filling station where all cartons 1205 destined for the Foodway stores are consolidated for shipment into, e.g., one crate 1310. It will be apparent to those of ordinary skill having the benefit of this disclosure that the destination information included on the destination address labels 1420 (which were applied to the individual cartons 1205 as noted above) may be read using a terminal 15 or other reading means to aid in the sorting and order-consolidation process.

During the packing of the crate 1310 destined for Foodway, the carton bar codes 1250 are read by a terminal 15 or other suitable means. The information read from the carton bar codes 1250 is used to build a shipment list, e.g., in the memory 31 of a base station 12 at the order filling point. The shipment list comprises identification information about each carton 1205 in the Foodway shipment.

Figure 13C:
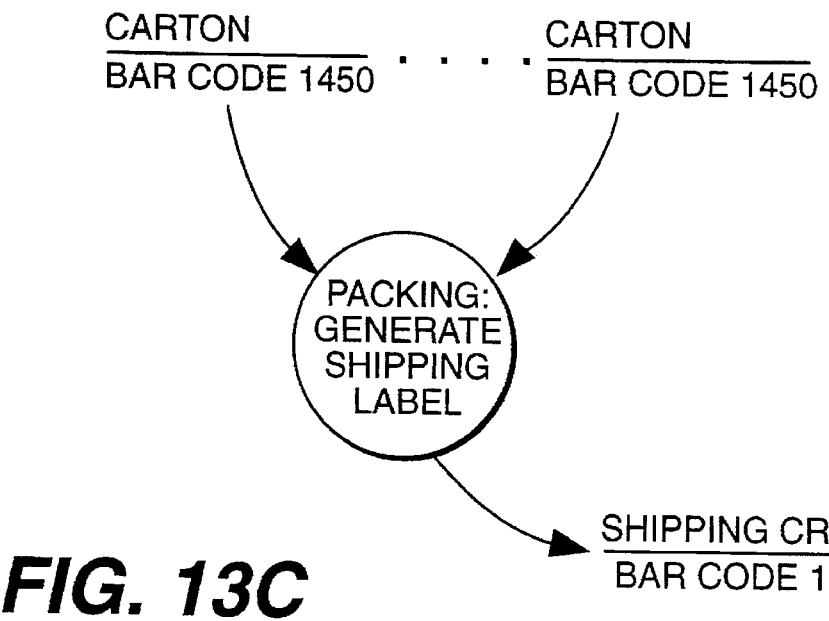
FIG. 13C is a flow diagram of the process for affixing a bar code label to shipping crate in system of the present invention.

As illustrated in FIG. 13C, when all cartons are loaded into the Foodway crate, a bar-coded crate shipping label 1350 is printed (e.g., at the printer 33A of a base station 12) and applied to the exterior of the crate. Alternatively, of course, the bar code label 1350 may be stenciled, spray painted, or otherwise applied to the crate. The shipping label 1350 may include virtually any information desired, e.g., the point of origin of the crate, the destination, the contact person(s) at either the origin or the destination, insurance information, and the like.

The crate 1310 with its bar-coded shipping label 1350 is shipped by any convenient means, e.g., a commercial carrier company, to Foodway's central warehouse 1308. A terminal 15 may be used to read the shipping label 1350 when the crate 1310 physically leaves the CerealCo facility; shipping and departure information may be transmitted to the CerealCo host computer 1404 and thereby to the Foodway host computer 1402 via the EDI link 1410 in a conventional manner.

Figure 13D:
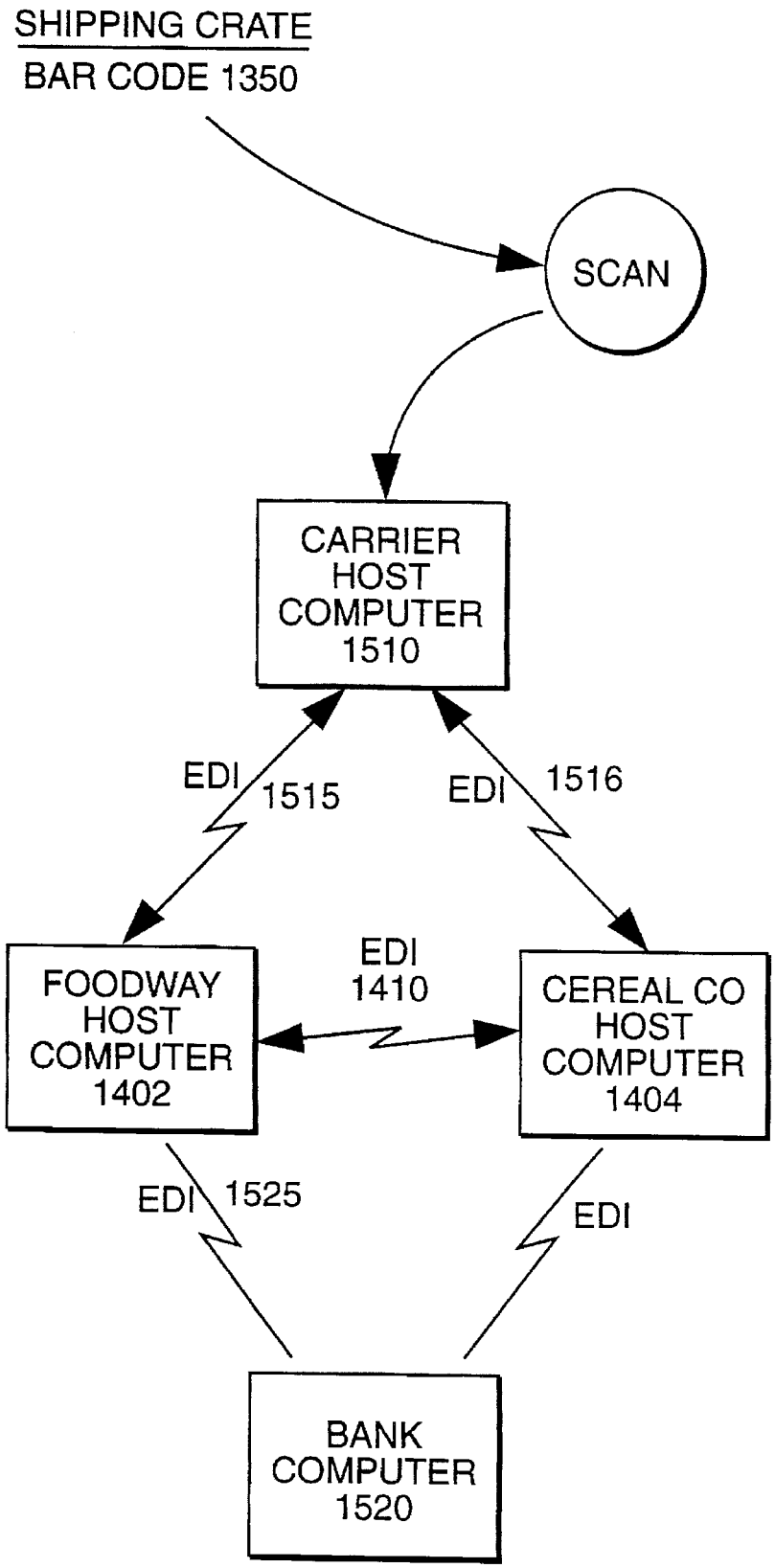
FIG. 13D is a block diagram illustrating a network connection of computers for tracing inventory in the system of the present invention.

While the crate 1310 is in transit, the carrier company may use a terminal 15 or other suitable means to read information from the crate shipping label 1350 as needed; additional bar codes may be printed and applied to the exterior of the crate as needed, e.g., to indicate handling instructions for the carrier company's personnel at various stages of the journey. As the crate 1310 arrives at particular points in the journey, this information may be transmitted to the carrier company's host computer 1510, where it may be made available as a status report to the Foodway and CerealCo host computers 1402 and 1404 via EDI links 1515 and 1516, respectively as illustrated in FIG. 13D.

When the crate 1310 arrives at the Foodway central warehouse 1308, Foodway personnel may use a terminal 15 or other suitable means to read information from the crate shipping label 1350. The fact of receipt and other information so read may be communicated to and stored in Foodway's host computer 1402, which may then relay the information to the CerealCo host computer 1404 and generate a payment order to be transmitted to a bank host computer 1520 via an EDI link 1525.

At Foodway's warehouse 1308, the crate 1310 is unloaded, and each carton bar code label 1250 is read using a terminal 15 or other suitable means. The destination information encoded in the bar code labels 1250 may be used in the manner described above for routing of the cartons 1205 to their respective specific destination Foodway stores. Alternatively, the information obtained by reading the bar code labels 1250 may be used to enter a lookup table, e.g., in the host computer's disk storage 24, in a conventional manner for this purpose.

Similar techniques may be used by Foodway personnel for processing incoming shipments that do not include bar code labels. The destination information in question may be read (e.g., with an OCR scanner (not shown) and/or by manual keyboard entry using the keyboard 48 of a terminal 15); carton bar code labels 1250 may then be printed and applied to incoming cartons 1205, and cereal box bar code labels 1215 may even be printed and applied to individual cereal boxes 1210, in the manner described above.

Figure 13E:
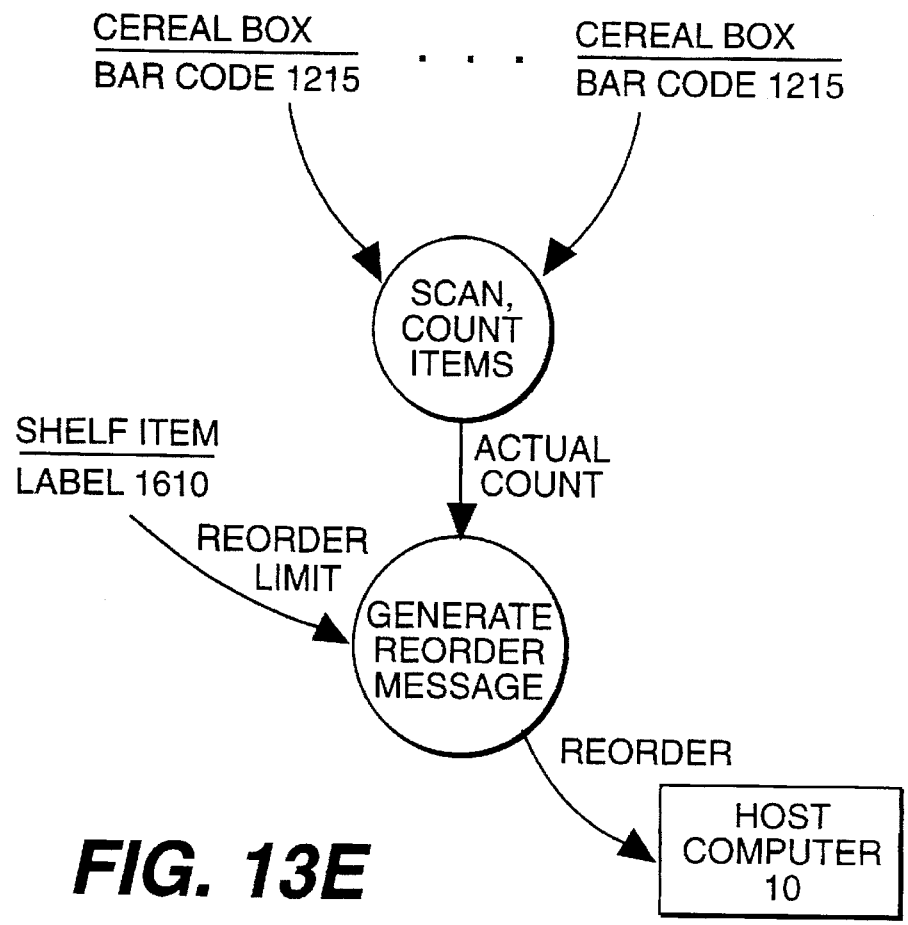
FIG. 13E is a flow diagram of retail store inventory control in the system of the present invention.

The retail store described above may use a system in accordance with the invention to manage its inventory more effectively. Referring to FIG. 13E, assume that the store utilizes conventional shelf item labels 1610, as is commonly seen in modern stores. The shelf item labels 1610 normally include human-readable information identifying specific items and stating the price; they also include bar-coded order information that can be as detailed as desired, e.g., the stock number of the item in question, the reorder limit (i.e., the lowest acceptable on-the-shelf count below which reordering is desired) and perhaps even information about the vendor or vendors who supply the item.

An inventory clerk may use a terminal 15 to read a shelf item label 1610. The terminal 15 may also be used to input an actual count of the items on the shelf, e.g., by reading bar codes (such as cereal box bar codes 1215) from each individual item or by manually counting the items and entering the count on the keyboard 48 of the terminal 15. If the actual count is below the reorder limit, the CPU 40 of the terminal 15 generates a reorder message and transmits it to the host computer 10. Alternatively or in addition, the actual count itself may of course likewise be transmitted to the host computer 10 for storage, e.g., in disk storage 24, allowing the count information to be used in generating reports in any convenient manner.

The bar code which is used in the systems of the present invention heretofore discussed, is the PDF417 two-dimensional bar code. Before discussing the method and apparatus for encoding and decoding data in machine readable graphic form, it is important to understand the structure of the two-dimensional bar code symbol itself.

Figure 6:
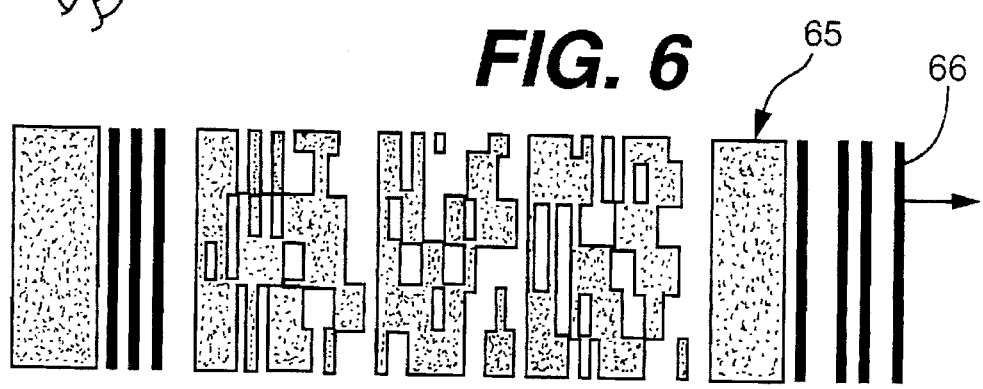
FIG. 6 is a view of a bar code symbol that may be read by the remote unit of FIGS. 4 and 5 or 5A.

Each PDF417 symbol (see FIG. 6) is composed of a stack of rows of bar-coded information. Each row in the symbol consists of a start pattern, several symbol characters called "codewords," and a stop pattern. A codeword is the basic unit for encoding a value representing, or associated with, certain numbers, letters, or other symbols. Collectively, the codewords in each row form data columns.

Both the number of rows and the number of data columns of the PDF417 symbol are variable. The symbol must have at least three rows and may have up to ninety rows. Likewise, within each row, the number of codewords or data columns can vary from three to thirty.

Figure 14:
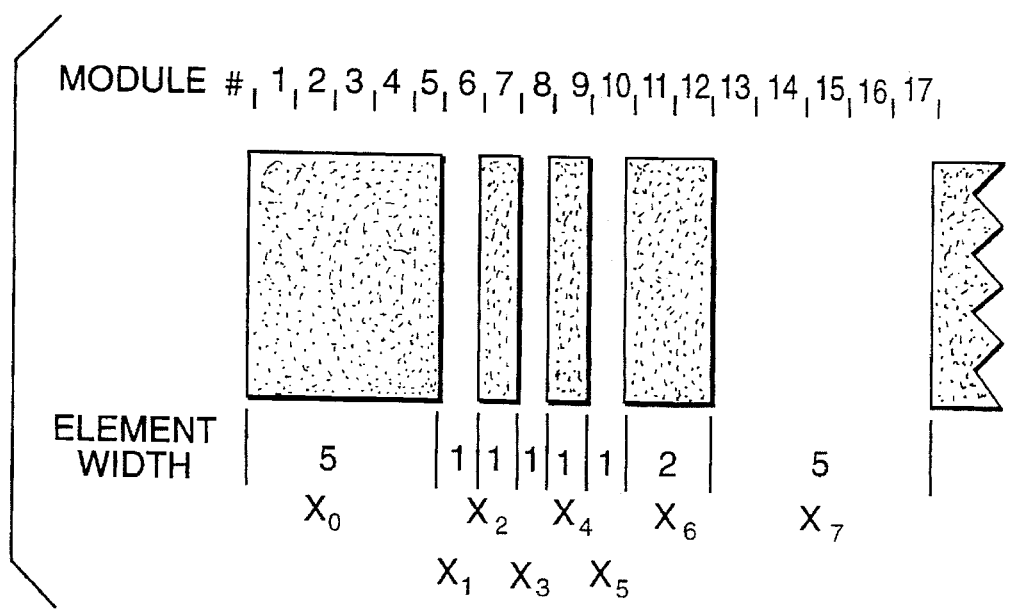
FIG. 14 is a diagram illustrating one example of a codeword in PDF417.

Each PDF417 codeword consists of seventeen modules or units. There are four bars and four spaces in each codeword. Individual bars or spaces can vary in width from one to six modules, but the combined total per codeword is always seventeen modules. Thus, each codeword can be defined by an eight digit sequence, which represents the four sets of alternating bar and space widths within the codeword. This is called the "X-sequence" of the codeword and may be represented by the sequence $X_0, X_1, \ldots X_7$. For example, for an X-sequence of "51111125," the first element is five modules wide, followed by five elements one module wide, one element two modules wide, and the last element five modules wide. This example is illustrated in FIG. 14.

The set of possible codewords is further partitioned into three mutually exclusive subsets called "clusters." In the PDF417 symbol, each row uses only one of the three clusters to encode data, and each cluster repeats sequentially every third row. Because any two adjacent rows use different clusters, the decoder is able to discriminate between codewords from different rows within the same scan line.

The cluster number of a codeword may be determined from its X-sequence using the following formula:

cluster number=$(X_0-X_2+X_4-X_6)$ mod 9 where "mod 9" is the remainder after division by nine. Referring to the codeword in FIG. 2, the cluster number is calculated as follows:

cluster number=(5−1+1−2)mod 9=3.

To minimize error probabilities, PDF417 uses only three clusters, even though nine are mathematically possible. Thus, each row uses only one of the three clusters 0, 3, or 6, to encode data, with the same cluster repeating sequentially every third row. Row 0 codewords, for example, use cluster 0, row 1 uses cluster 3, and row 2 uses cluster 6, etc. In general, the cluster number may be determined from the row number as follows:

cluster number=((row number) mod 3)*3.

There are 929 codeword values defined in PDF417. These values are 0 through 928. Each cluster presents the 929 available values with distinct bar/space patterns so that one cluster cannot be confused with another.

Figures 15, 16:
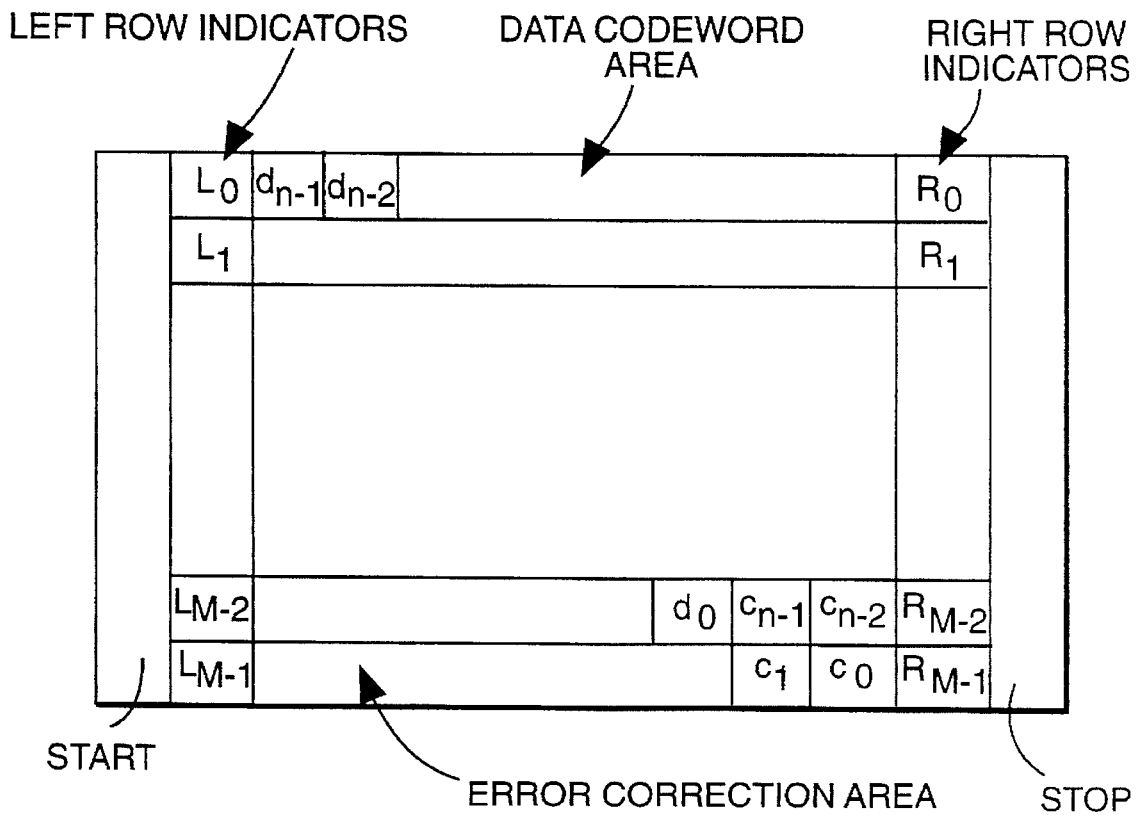
FIG. 15 is a diagram illustrating the overall structure of a PDF417 symbol.
FIG. 16 is a table listing the number of error correction codewords for a given security level in PDF417.

FIG. 15 is a block diagram showing the overall structure of a PDF417 symbol. Each row of the symbol consists of a start pattern, a left row indicator codeword $L_i$, data codewords $d_i$, or error detection/correction codewords $C_i$, a right row indicator codeword $R_i$, and a stop pattern. The minimum number of codewords in a row is three, including the left row indicator codeword, at least one data codeword, and the right row indicator codeword. The right and left row indicator codewords, which are discussed further below, help synchronize the structure of the symbol.

The start and stop patterns identify where each row of the symbol begins and ends. PDF417 uses unique start and stop patterns. The start pattern, or left side of each row, has the unique pattern, or X-sequence, of "81111113". The stop pattern, or right side of each row, has the unique X-sequence of "711311121."

Every symbol contains one codeword (the first data codeword in row 0) indicating the total number of codewords within the symbol, and at least two error-detection codewords $C_0$ and $C_1$. These two error-detection codewords together form a checksum which is two codewords long.

A PDF417 symbol can also encode data with error correction capability. The level of error correction capability, called the "security level," is selected by the user and ranges from 0 to 8, This means, for example, that at level 6, a total of 126 codewords can be either missing or destroyed and the entire symbol can be read and decoded. FIG. 16 is a table showing the relationship between the security level of the PDF417 symbol and the number of error correction codewords $C_i$.

In addition to correcting for missing or destroyed data (known as "erasures"), PDF417 can also recover from misdecodes of codewords. Since it requires two codewords to recover from a misdecode, one to detect the error and one to correct it, a given security level can support half the number of misdecodes that it can of undecoded codewords.

This error correction feature is particularly useful when information in PDF417 format overlays partially erased coded words. This partial erasure creates the possibility that the unerased code portions will distort portions of the encoded information. If that happens, errors can be corrected with the PDF417 two-dimensional bar code.

The row indicator codewords in a PDF417 symbol contain several key components: row number, number of rows, number of data columns, and security level. Not every row indicator contains every component, however. The information is spread over several rows, and the pattern repeats itself every three rows. The pattern for encoding the information in the row indicator codewords can be illustrated as follows:

Row 0: $L_0$ (row #, # of rows)$R_0$ (row #, # of columns)
Row 1: $L_1$ (row #, security level)$R_1$ (row #, # of rows)
Row 2: $L_2$ (row #, # of columns)$R_2$ (row #, security level)
Row 3: $L_3$ (row #, # of rows)$R_3$ (row #, # of columns) etc.

In other words, the left row indicator codeword $L_0$ for the first row 0 contains the row number (0) and the total number of rows in the symbol. The right row indicator codeword $R_0$ for row 0 contains the row number (0) and the number of data columns in the symbol, and so on.

Encoding data into a PDF417 symbol is typically a two-step process. First, data is converted into codeword values of 0 to 928, which represent the data. This is known as "high-level encoding." The values are then physically represented by particular bar-space patterns, which is known as "low-level encoding."

Figure 17:
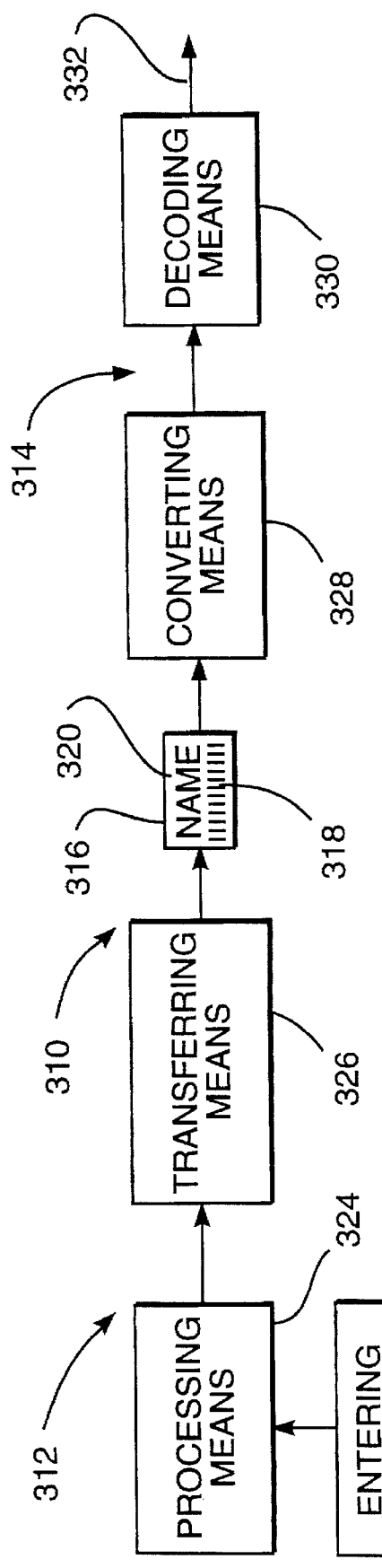
FIG. 17 is a block diagram of a system for printing and reading codes.
Figure 18:
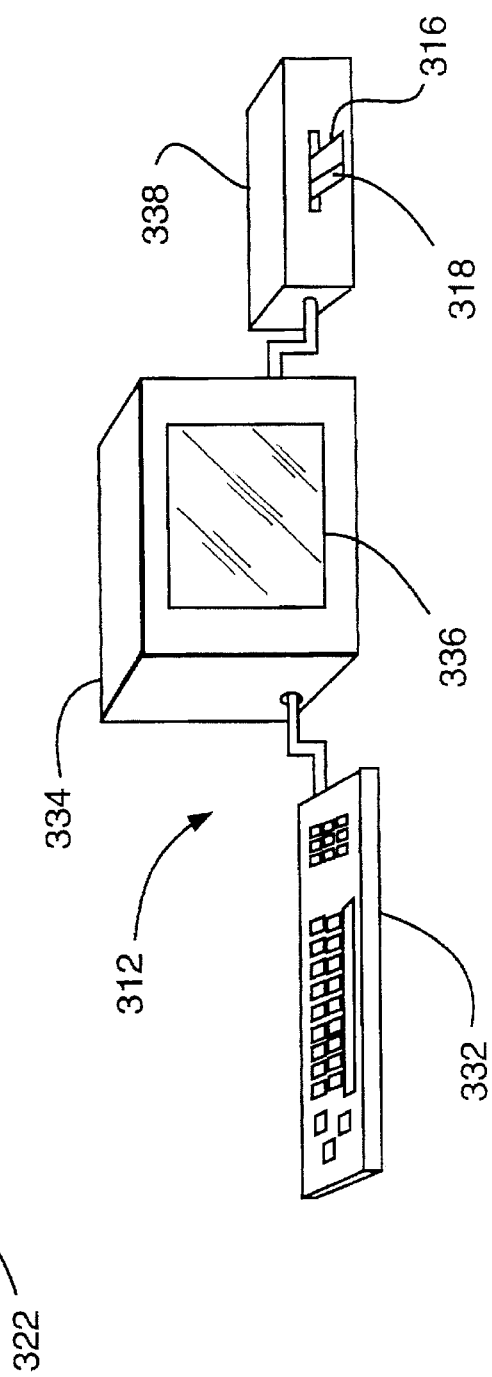
FIG. 18 is a perspective view of an encoding means of the system in FIG. 17.
Figure 20:
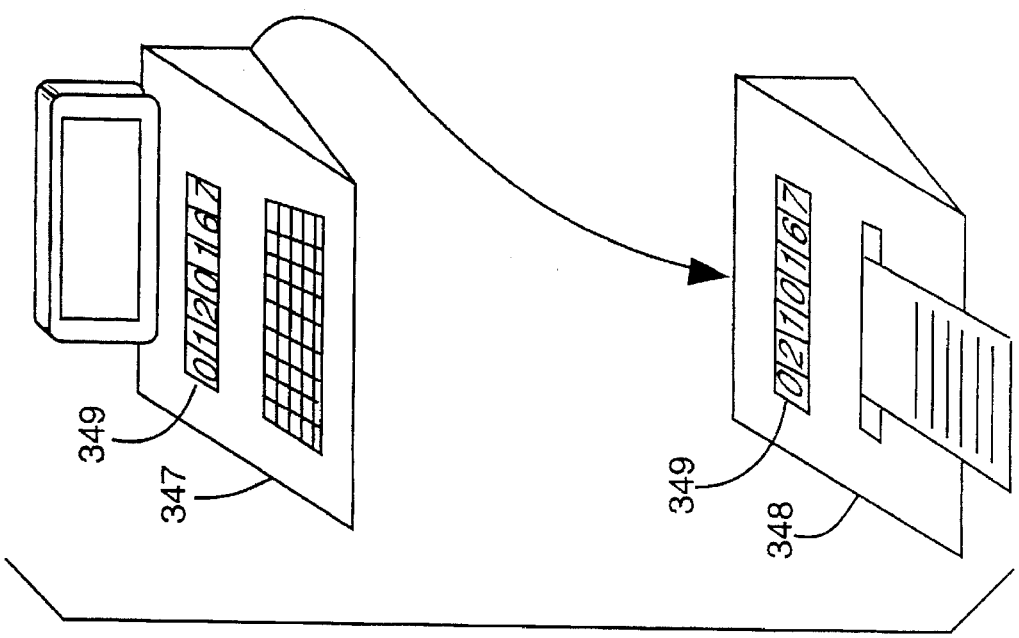
FIG. 20 is a perspective view of a data entry device and reader in which a key may be entered for encrypting and decrypting data.
Figure 19:
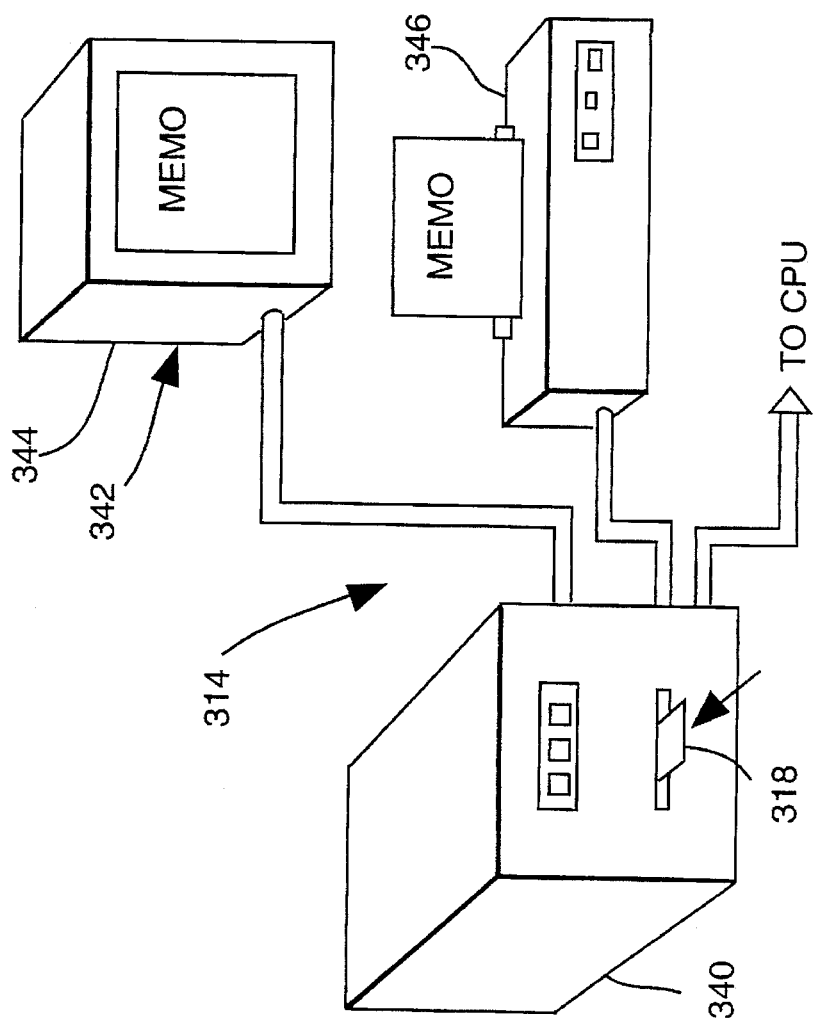
FIG. 19 is a perspective view of a recognition means of the system in FIG. 17.

Referring now to FIGS. 17–19 in the drawings, FIG. 17 is a block diagram of a system 310 for representing and recognizing data on a record in machine readable graphic image form. System 310 includes an encoding means, generally indicated by the reference numeral 312, and a recognition means, generally indicated by the reference numeral 314. The two-dimensional pattern is recognized by recognition means 314 to produce output signals representative of the data encoded into the respective pattern.

Data to be encoded into the two-dimensional pattern on record 318 is entered into the encoding means 312 by entering means 322. The data entered by entering means 322 may include both data to appear on record 316 in human readable form. Processing means 324 encodes the set of data into a two-dimensional pattern and generates transfer drive signals for controlling the transfer of indicia onto the record 316. Transferring means 326 transfers an image of the two-dimensional pattern 318 onto record 316 in response to the transfer drive signals. Preferably, transferring means 326 includes a printer which transfers either light-colored ink or ultraviolet-light sensitive ink as explained above.

If human readable data is also to be transferred onto record 316, the processing means 324 generates a second set of transfer drive signals for controlling the transfer of the human readable data onto record 316. A portion or all of the data to be encoded and the human readable data may be transferred from a storage memory in processing means 324 or other computer files rather than being entered by means 322.

Recognition means 314 includes converting means 328 that converts the image on record 316 into electrical signals representative of the graphic indicia. Decoding means 330 decodes the electrical signals into decoder output signals, indicated at 332, that are representative of the data encoded into the pattern 318.

FIG. 18 is a perspective view of one embodiment of encoding means 312. The embodiment of FIG. 18 is for illustrative purposes, and not meant to limit the scope of the invention. In this embodiment, the entering means 322 of FIG. 17 is shown in form of a keyboard 332 for entering alphanumeric and graphic data into the encoding means 312. Entering means 322 may take forms other than a keyboard, such as an optical scanning means for scanning data directly from documents for entry into the encoding means 312.

Referring again to FIG. 18, the processing means 324 of FIG. 17 is shown in the form of a processor and display unit 334. The data entered by keyboard 332 is transmitted to the processor and display unit 334 for storage and processing. In addition to entering data, the keyboard 332 is also used for entering control commands to effect operation of the processor unit 334.

The data entered by keyboard 332 is preferably displayed on display screen 336, and upon entry of a proper control command, is also stored in memory. The data to be encoded into the pattern 318 is stored in a first memory in processor 334, and the data, if any, to be transferred in human readable form is stored in a second memory. Alternatively, both data may be stored in a separate portion of a single memory. Upon the appropriate control command from keyboard 332, the processor unit 334 encodes the data in the first memory into a two-dimensional pattern 318 and generates first transfer drive signals representative of the data stored in the first memory. The processor unit 334 also generates second transfer drive signals representative of the data stored in the second memory.

The processor unit 334 is shown in FIG. 18 as being coupled to a printer 338. Printer 338 is one form of the transferring means 326 of FIG. 17. Printer 338 transfers an image of the two-dimensional pattern 318 on record 316 in response to the first transfer drive signals and prints the second set of data in human readable form onto record 316 in response to the second transfer drive signals.

Turning now to FIG. 19, the recognition means 314 includes a card reader 340 which contains the converting means 328 and the decoding means 330 of FIG. 17. The use of appropriate converting means that corresponds to the particular data encoding technology employed is contemplated by the present invention.

The converting means 328 may be a bar code reader such as those disclosed in U.S. patent application Ser. Nos. 317,433 and 317,533, and incorporated herein by reference, which can read the ink used by printer 338. The readers disclosed in the above patent applications are open system devices designed to read an optically encoded two-dimensional bar code and to convert the light reflected from the pattern into electrical signals representative of the graphic indicia.

The decoding means 330 decodes the electrical signals into output signals representative of the data encoded onto record 316. The decoder output signals are outputted from the recognition unit 340 to various output means 342. FIG. 19 depicts two examples of output devices, one being a display unit 344 and the other a printer 346. Display unit 344 may be any suitable display such as liquid crystal display or a CRT. The printer 346 may be any print device such as a dot matrix printer, laser printer, etc.

The system maximizes the use of available space for encrypting data. The density of the encoded data is such that for a two-dimensional bar code symbol, a minimum of about 1600 characters can be encoded into a space of approximately 5"×½". In addition to being compact, the system provides for high security in the transmission of information.

Although the encoding means 312 and the recognition means 314 are shown in FIGS. 17 through 19 as separate devices, they can be in the same device. This is particularly useful when a record is read and modified. In such cases it would be useful to have a single unit for both purposes.

A low-level decoder may be embodied in a computer program operating on a microcomputer separate from host computer 10. The low-level decoder would be preferably connected to the host computer by a standard interface, such as an RS-232 interface, for transmitting the codeword values after they are decoded. Alternatively, the low-level decoder could be embodied entirely in hardware, or a combination of a hardware and software, which is physically located in either the scanner itself or the host computer.

The matrix of codeword values from low-level decoder is decoded into usable data by a high-level decoder, which may be embodied as a separate computer program operating on the host computer. For example, PDF417 has three predefined modes and nine reserved modes. The predefined modes are Binary, EXC, and Numeric. In the Binary mode, each codeword can encode 1.2 bytes. In the EXC mode, the alphanumeric data can be encoded in double density (i.e., two characters per code word), and in Numeric mode, the numeric data can be packed in almost triple density. Therefore, the high-level decoder in host computer 112 will further decode the codeword values (0–928) from low-level decoder 114, depending on the mode, to obtain the actual data embodied in the symbol. The decoded data from the high-level decoder may then be used by a user application program also operating on host computer 10.

Figure 21:
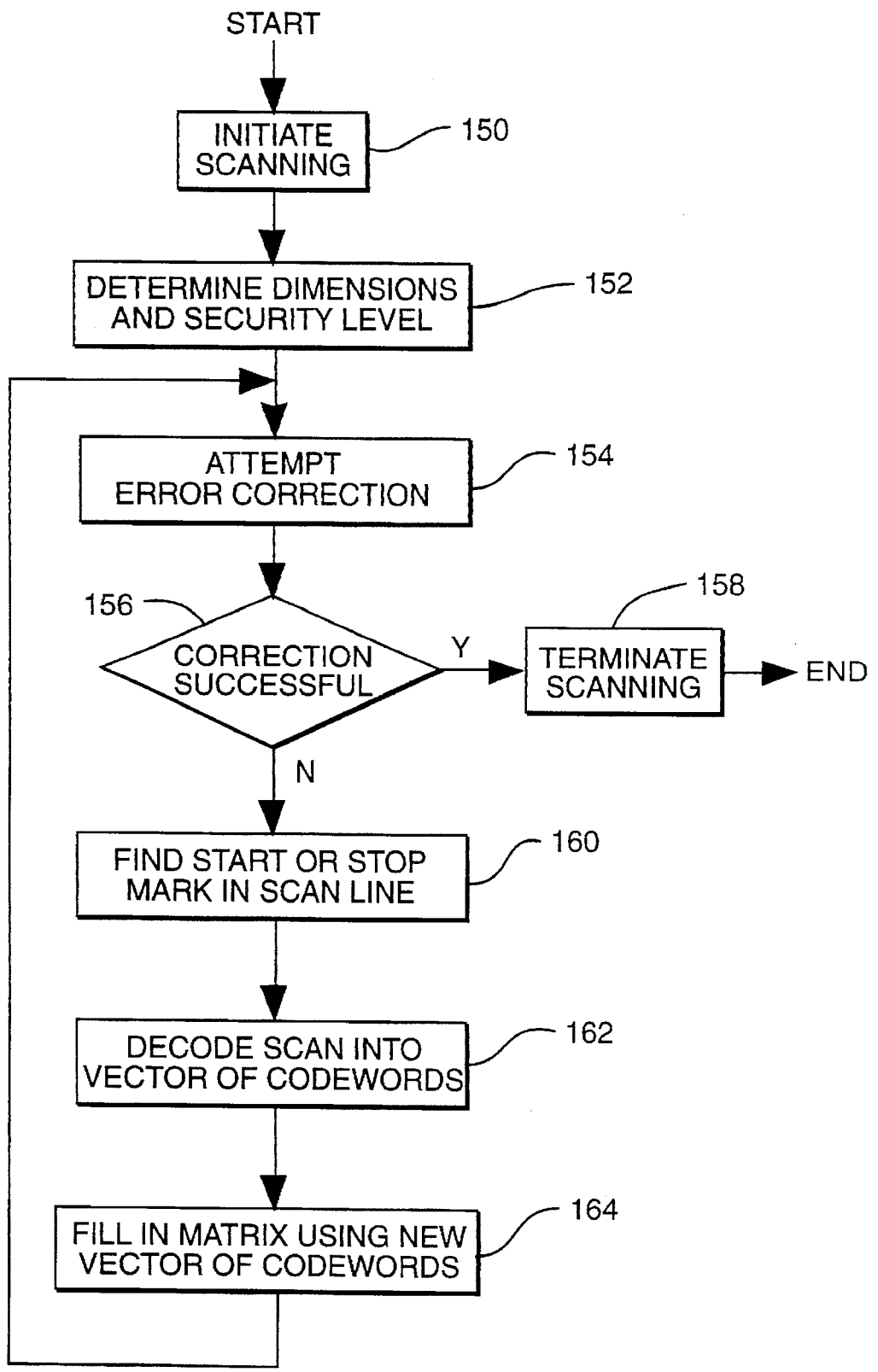
FIG. 21, is a flow diagram of the steps performed by the low-level decoder for decoding a two-dimensional bar code symbol.

FIG. 21 is a flow chart showing the sequence of operation of a low-level decoder for decoding a two-dimensional bar code symbol such as PDF417 into a matrix of codeword values. The various steps in the sequence are embodied in a software computer program which is stored and executed by processor 334.

In the first step 150 in FIG. 21, the low-level decoder initializes the scanner interface and initiates scanning of the symbol. The actual functions performed in this step will depend on the type of scanner and will involve various scanner dependent routines to initialize the scanner interface and to start scanning.

In step 152, the low-level decoder attempts to determine the dimensions and the security level of the symbol being scanned. Specifically, this step determines the number of rows, the number of data columns, and the security level of the symbol from the left and right row indicator codewords. These dimensions are then used to initialize a two-dimensional codeword matrix and other related parameters for decoding the symbol. Each location in the matrix contains both a codeword value and an associated confidence weight, which are initially set to a null or empty value. If the dimensions and security level of the symbol cannot be determined, then the scan is aborted. This step will be discussed in further detail below in connection with FIG. 22.

Continuing in FIG. 21, step 154 is the first step in a control loop in which the rows of the two-dimensional bar code symbol are repeatedly scanned and the codeword values are filled into the codeword matrix. The steps of the control loop are each repeated until the number of codewords remaining in the matrix which have not been successfully decoded is small enough that the rest of the matrix can be determined using the built-in error correction capability of the symbol. Thus, in step 154, if the number of codewords which have not been successfully decoded is less than the error correction capability of the symbol based on the security level (see FIG. 4), an attempt is made to correct the matrix using the error-correction codewords. If the attempted error correction is successful, then in step 156, the control loop is exited and scanning is terminated in step 158. Otherwise, if the attempted error correction is not successful, then the following steps 160–164 are performed to try to decode additional codewords to fill in the matrix.

First, step 160 searches a scan line of data obtained from the buffer area of the memory for a start or a stop pattern. If either a start or a stop pattern is found, then in step 162, the low-level decoder attempts to decode as many codewords as possible from the scan line. Specifically, the scan line of data is placed into individual codewords whose values and cluster numbers are placed in a codeword vector ready for incorporation into the codeword matrix. Both steps 160 and 162 are discussed in further detail below in connection with FIGS. 23 and 25, respectively.

The codeword vector produced in step 162 is analyzed and then used to update the codeword matrix in step 164. In particular, step 164 assigns a confidence weight to each codeword value depending on whether its nearest neighbors were also decoded. Row numbers are also assigned to each codeword value based on the left or right row indicator codewords and the corresponding cluster number for the codeword. If the scan line crosses a row boundary, the cluster numbers of the codewords can be used to determine the correct row number for each individual codeword. For example, if a decoded scan line has a left row indicator with row number 2, and the cluster numbers of the following codewords are 6, 0, 0, 3, the codewords are accordingly placed in the following locations: (row 2, column 1); (row 3, column 2); (row 3, column 3); and row 4, column 4). In this way, a single scan line of data can contain codewords from more than one row, which can then be stitched into the appropriate location in the codeword matrix. This step is discussed in further detail in connection with FIGS. 28A and 28B below.

Figure 22:
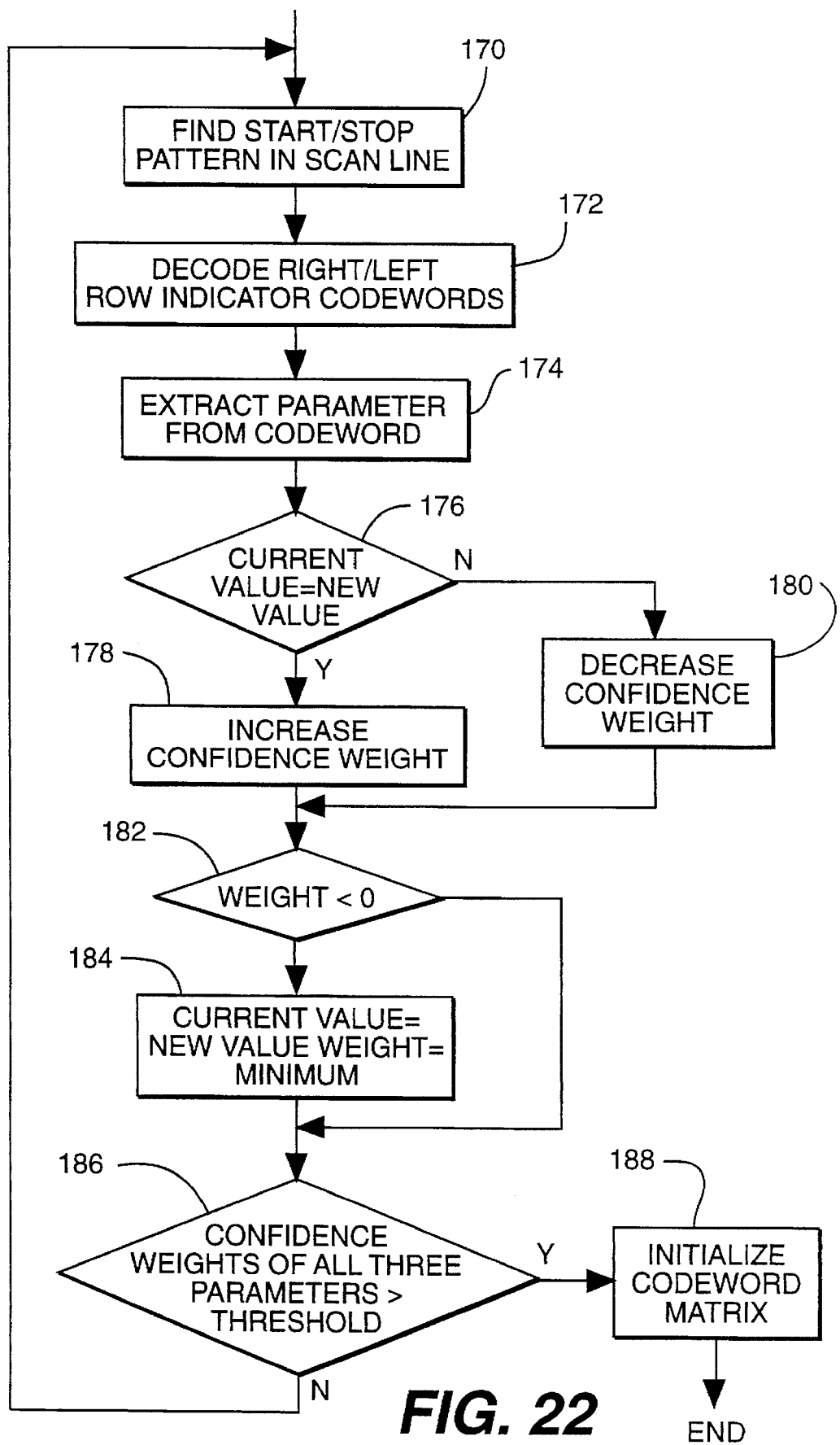
FIG. 22 is a flow diagram of the steps performed by the low-level decoder for determining the dimensions and security level of the symbol being scanned.

FIG. 22 is a flow chart showing in greater detail the sequence of steps for determining the dimensions and security level of a symbol as referred to in step 152 of FIG. 21 above. In the first step 170 of FIG. 22, the low-level decoder searches a scan line of data obtained from the buffer area of the memory for a start or a stop pattern. This step is the same as step 160 in FIG. 21 and is discussed in further detail in connection with FIG. 23 below.

Step 172 then decodes the first codeword immediately adjacent to either the start or stop pattern found in the previous step. As shown in FIG. 15, this codeword will be either a left or right row indicator codeword containing the row number and either the number of rows, the number of data columns, or the security level of the symbol. If both a start and a stop pattern are found, then both the left and the right row indicators are decoded. The sequence of steps for decoding an individual codeword are discussed further below in connection with FIG. 27.

Continuing in FIG. 22, in step 174 the particular dimension or security level encoded in the row indicator is extracted from the codeword value and the cluster number determined in the previous step 172. For example, for a left row indicator codeword with a cluster number of 0, the number of roars is extracted from the codeword value.

A confidence weight assigned to each of the dimensions and the security level is initially set to 0. Steps 176–184 update both the current value and the confidence weight of the dimension or security level extracted in the previous step in the following way. First, the particular parameter, say the number of rows, is compared to the current value of the number of rows obtained from previous decodes. If the current value of the number of rows and the newly decoded value are the same, as determined in step 176, then the confidence weight assigned to the number of rows is increased in step 178. If the current value and the newly decoded value are different, however, then the confidence weight is decreased in step 180. If the confidence weight assigned to the particular parameter is decreased below zero as determined in step 182, then the newly decoded value is substituted for the current value and a new minimum weight is assigned to the parameter in step 184.

Step 186 determines whether the confidence weight for all three parameters, i.e., number of rows, number of data columns, and security level, exceeds a predetermined threshold. If so, then the two-dimensional codeword matrix is initialized in step 188 based on the current values of the number of rows and the number of columns. The number of correctable errors may also be determined from the current value of the security level according to the table in FIG. 16. If all three confidence weights do not exceed the threshold in step 186, however, then program control returns to step 170 to begin searching for the start and stop patterns in a new scan line. Steps 170–184 are repeated until all three parameters have been successfully decoded with a high degree of confidence.

Figure 23:
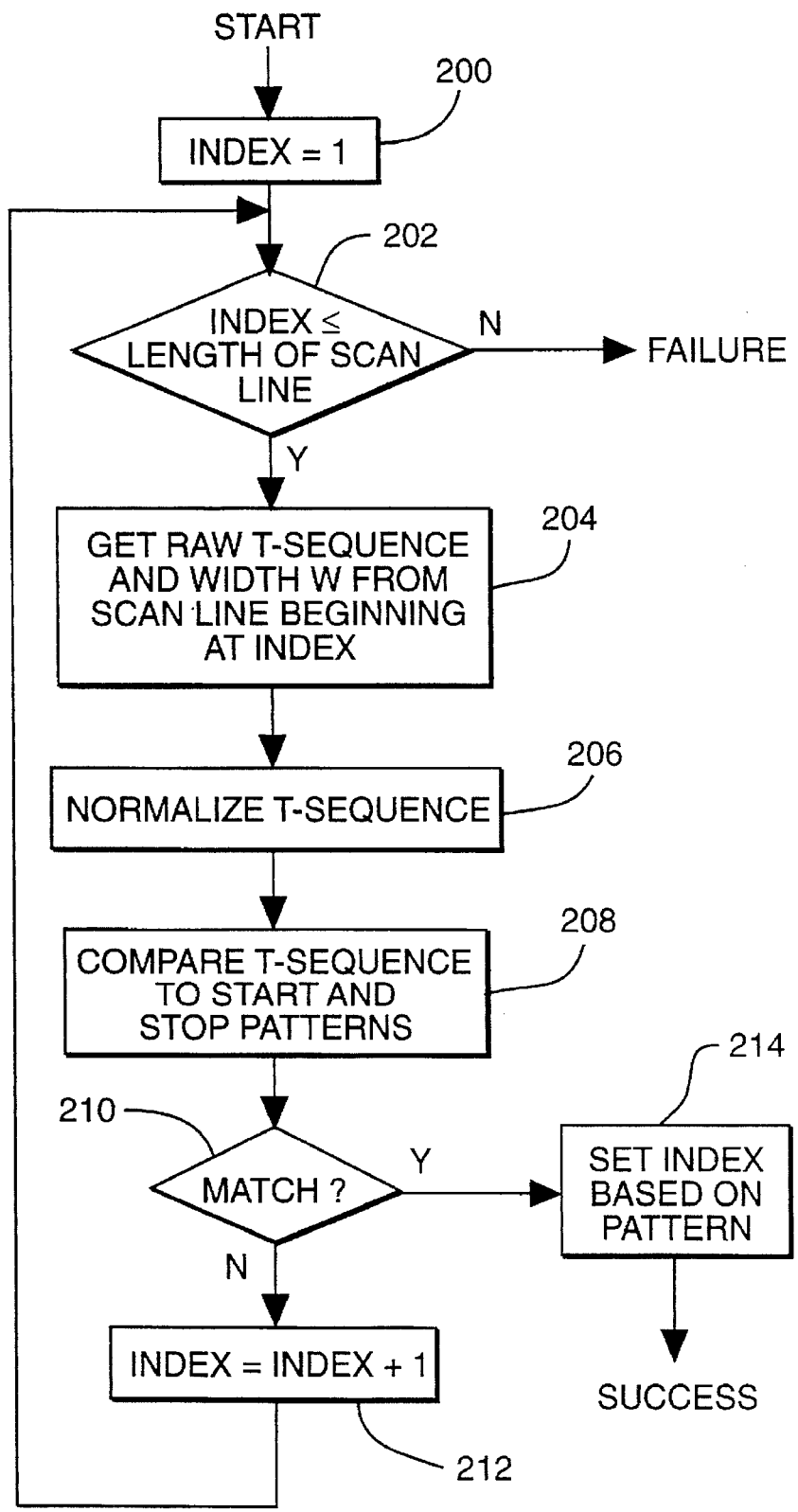
FIG. 23 is a flow diagram of the steps performed by the low-level decoder for searching a scan line of data for a start or a stop pattern.

FIG. 23 is a flow chart showing in greater detail the sequence of steps for searching a scan line of data for a start or stop pattern as referred to above in step 160 of FIG. 21 and step 170 of FIG. 22. Briefly, the search begins at the first location of an individual scan line of data obtained from the buffer area of the memory and is repeated at sequential locations until either a match is found or the length of the scan line is exceeded. When a match is found, an index is set to a location immediately following or preceding the pattern for decoding the adjacent code word.

As shown in FIG. 23, the first step 200 sets an index to the location of the data elements in the scan line to "1," indicating the first data element or integer value of the scan line. This index is used to identify the first element of each sequence of eight elements in the scan line for comparison to the start and stop patterns.

Step 202 is the first step of an iterative loop for searching the scan line from left to right for either a start or a stop pattern. In this step, if the current index is less than the length of the scan line, then the remaining steps are executed and the search continues. Once the index exceeds the length of the scan line, however, then the loop is exited and an indication is returned signifying that the search failed and a start or stop pattern was not found.

Rather than using the X-sequence of codeword, the low-level decoder decodes a symbol by using "edge to similar edge" measurements to compensate for ink spreading which occurs when printing the symbols. Thus, in step 204, a raw "t-sequence" is obtained from the scan line by adding pairs of consecutive integer values beginning at the location specified by the index. Specifically, the raw t-sequence, which corresponds to the seven width measurements $t_1, t_2, \ldots t_7$ shown in FIG. 24, is calculated by adding pairs of the consecutive integer values $x_0, x_1, \ldots x_7$, representing the widths of the bars and spaces, as follows:

$$t_1 = x_0 + x_1$$
$$t_2 = x_1 + x_2$$
$$t_3 = x_2 + x_3 \text{etc.}$$

A width W for the entire codeword is also calculated in step 204 by summing the eight integer values $x_0 + x_1 + \ldots + x_7$.

Figures 24, 26A:
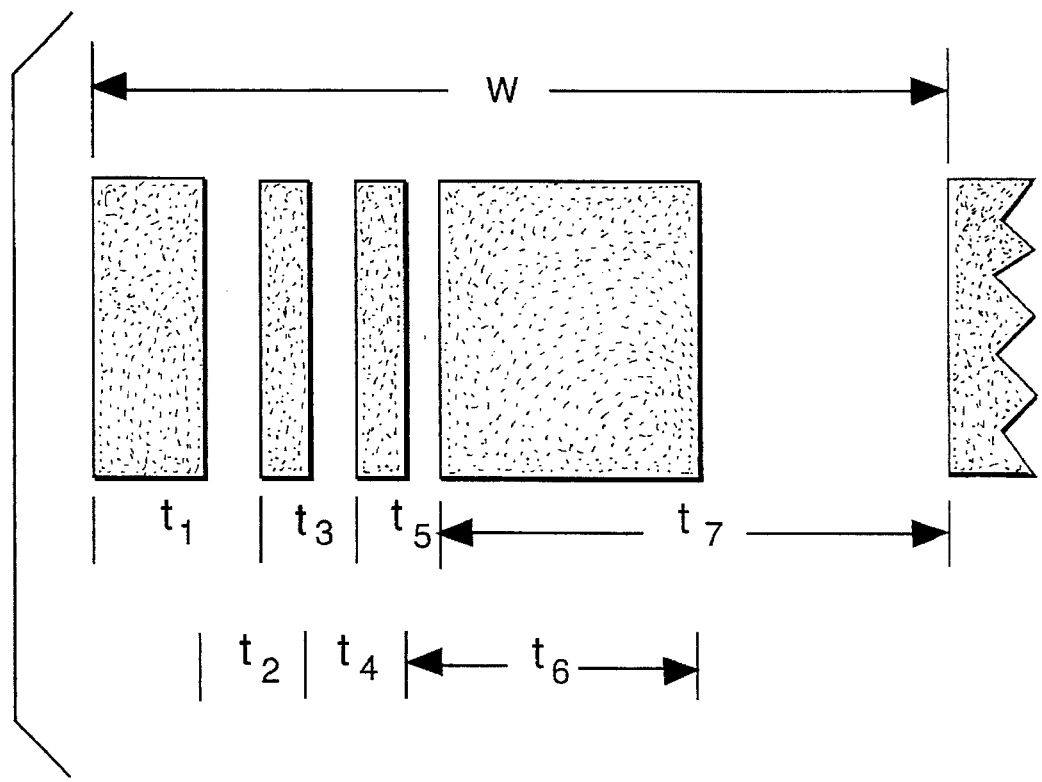

For the codeword in FIG. 24, for example, the sequence of integer values from the scan line, representing the widths of the bars and spaces might be something like: 43, 19, 21, 19, 22, 18, 103, 96. The raw t-sequence $t_1, t_2, \ldots t_7$ would then be 62, 40, 40, 41, 40, 121, 199, and the width W would be 341.

In step 206 in FIG. 23, the raw t-sequence obtained in step 204 is normalized and rounded to integer values. Specifically, a value for the codeword's "module" or "unit" is first established by dividing the width W of the codeword by the total number of units for each codeword. In a PDF417 symbol, each codeword is seventeen units, so that the width W is divided by seventeen to obtain the unit of the codeword. Thus, for the example in FIG. 24, the unit would be (341/17)=20.0. Each value of the raw t-sequence is then divided by the unit and rounded to an integer to normalize the t-sequence. The normalized t-sequence for the codeword in FIG. 24 is 3, 2, 2, 2, 2, 6, 10.

The normalized t-sequence is then compared to the t-sequences of the start and stop patterns of the code in step 208. If the scanner scans from both left to right and right to left, then the t-sequence must be compared to the start and stop patterns in both their normal and reverse orientations.

If there is a match in step 210, then the index is set in step 214 to a location in the scan line immediately following the pattern if it is a start pattern or immediately preceding it if it is a stop pattern. If the current t-sequence does not match either the start or the stop pattern, however, then in step 212, the index is incremented by one and steps 202 through 210 are repeated until either a match is found or the length of the scan line is exceeded.

Figure 25:
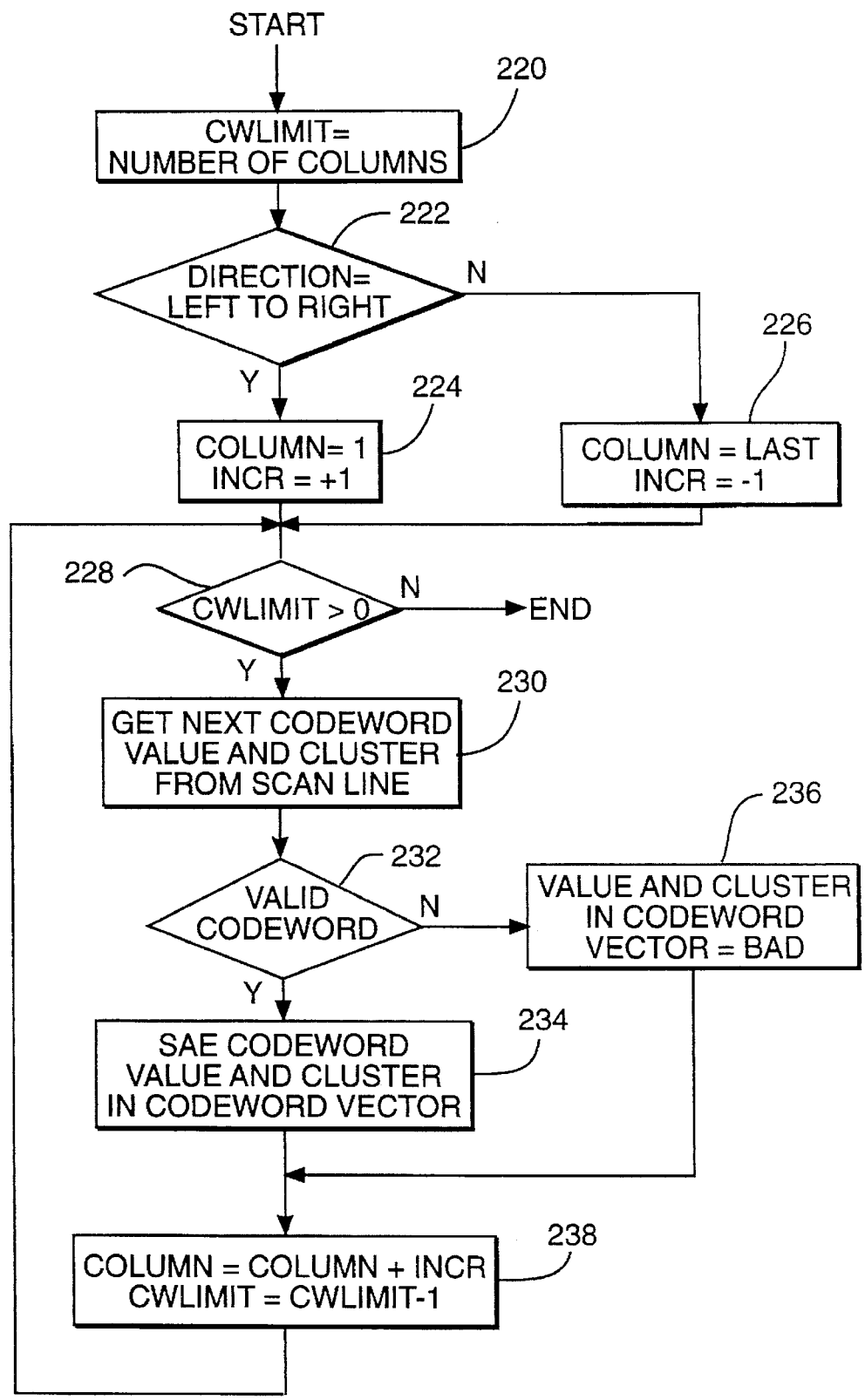
FIG. 25 is a flow diagram of the steps performed by the low-level decoder for decoding a scan line of data into a vector of codeword values and their cluster numbers.

FIG. 25 is a flow chart showing in greater detail the sequence of steps for decoding a scan line of data into a vector of codewords and their clusters as referred to in step 162 of FIG. 21 above. In decoding the individual codeword values and cluster numbers from the scan line, the low-level decoder begins decoding at the start or stop pattern and decodes as many codewords possible. For those codewords that are not successfully decoded, the codeword values in the codeword vector are set to "BAD."

At the completion of the sequence of steps shown in FIG. 25, the codeword vector will contain certain codeword values and cluster numbers in locations corresponding to the appropriate columns of the codewords that were successfully decoded. FIG. 26A shows an example of a codeword vector in which the codewords in eight of the ten columns were successfully decoded. The codeword values in columns 1 and 10 correspond to the left row indicator codeword in row 2 ($L_2$) and the right row indicator codeword in row 1 ($R_1$), respectively. The codewords in columns 5 and 7 were not successfully decoded as indicated by the notation "BAD" in those locations of the codeword vector.

Returning to the first step 220 of FIG. 25, an upper limit on the number of codewords that may be decoded ("cwlimit") is set equal to the number of columns in the codeword matrix. If this number of codewords is successfully decoded, then the decoding process for the current scan line is obviously complete.

Step 222 determines the direction of the scan if the scanner scans from both left to right and right to left. If the particular scan was from left to right as determined in step 222, then the column number of the first codeword is set to "1" in step 224 and the amount that it will incremented by ("incr") each time a subsequent codeword is decoded is set to "+1." If the scan was from right to left, however, then in step 226, the column number of the first codeword in the scan line will be the last column of the codeword matrix, and the incremental value is set to "−1."

Step 228 is the first step of a control loop in which individual codeword values and their cluster numbers are decoded from the scan line of data. In step 228, the codeword limit is tested to see if it is still greater than zero. If not, then all of the codewords in the scan line have been decoded and the loop is exited.

Otherwise, step 230 obtains the next codeword value and its cluster number from the scan line. This step will be discussed in further detail below in connection with FIG. 27.

If the codeword decoded in the previous step is a valid codeword as determined in step 232, then in step 234 the codeword value and its cluster number are saved in the codeword vector at a location corresponding to the column of the codeword. The codeword values thus placed in the codeword vector are ready for incorporation into the codeword matrix.

If the codeword decoded in step 230 is not a valid codeword, however, then the codeword value in the codeword vector corresponding to the current column is set to "BAD" in step 236 to indicate that this codeword was not successfully decoded. A "BAD" codeword is most likely to occur when the scan line crosses the boundary between two rows in the middle of the codeword.

Finally, in step 238, the current column number is either incremented or decremented depending on the direction of the scan, and the codeword limit is decremented by one. Steps 228–236 are then repeated until there has been an attempt to decode all of the codewords in the scan line.

Figure 27:
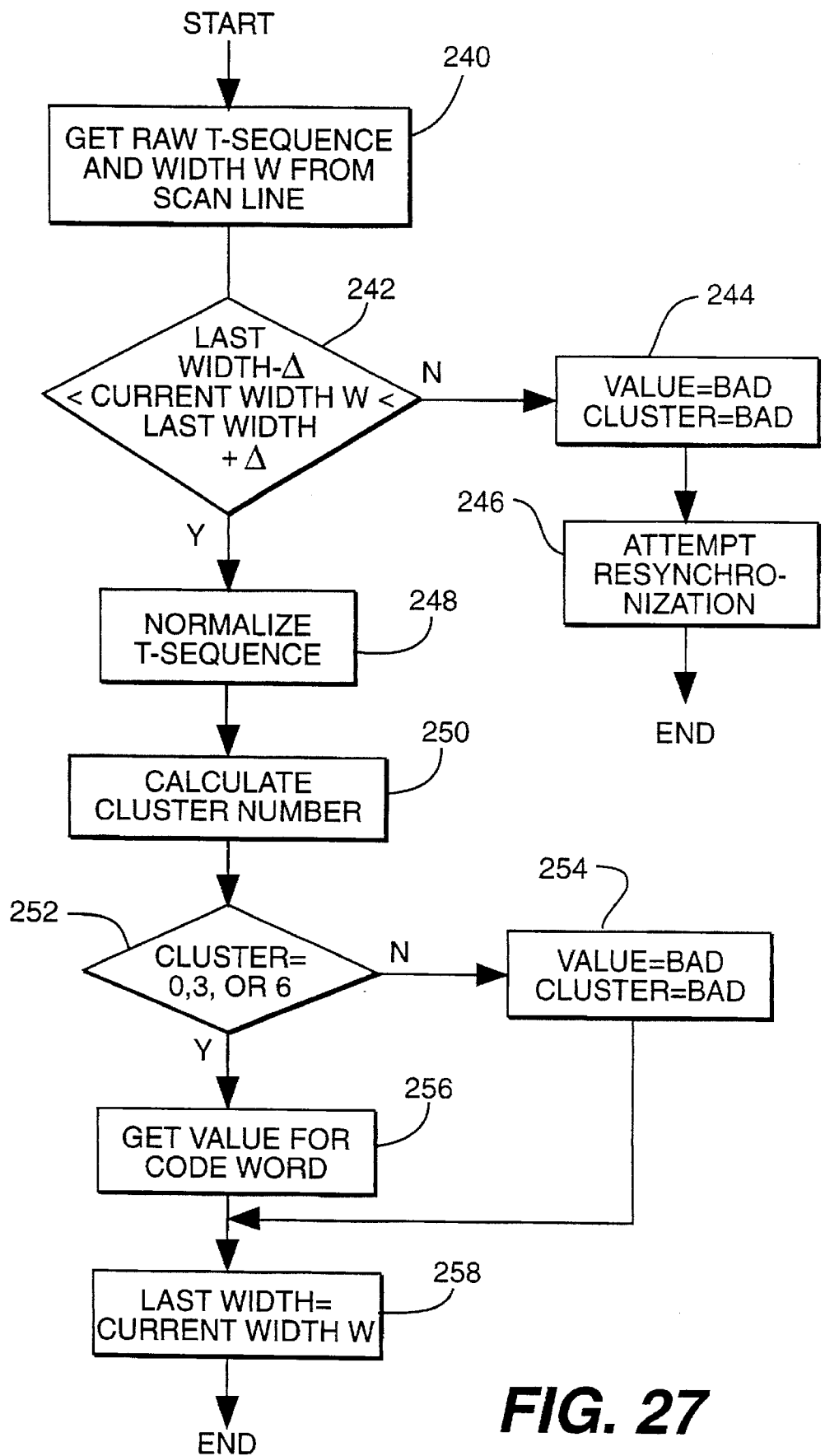
FIG. 27 is a flow diagram of the steps performed by the low-level decoder for decoding an individual codeword value and its cluster number from the scan line data.

FIG. 27 is a flow chart diagram showing the sequence of steps corresponding to step 230 in FIG. 25 and step 172 in FIG. 22 in which an attempt is made to decode an individual codeword value and cluster number from the scan line. In the first step 240, a raw t-sequence and the width W are obtained from the scan line. This same step was discussed previously in connection with step 204 in FIG. 23.

In step 242, the width W of the eight elements presumed to be the next codeword are compared to the width of the previously decoded codeword. If the current width W is not within a range of plus or minus a predetermined difference (delta), then there is probably a split (undercount by a multiple of two elements) or a merge (overcount by a multiple of two elements) error in the current codeword. This codeword is not decoded further, but rather in step 244 its value and cluster number are both set to BAD to indicate that it could not be decoded.

Then in step 246, an attempt is made to resynchronize to the boundary of the next codeword by finding a t-sequence with a corresponding width W that falls within a given tolerance of the expected width of a codeword, based on the width of the previous codeword. If the current width W is significantly greater than the expected width, indicating a possible merge error, then the last two integer values are dropped from the t-sequence until it falls within the proper limits. Likewise, if the current width W is significantly less than the expected width, indicating a possible split error, the next two integer values in the scan line are added to the t-sequence until it falls within the proper limits.

If the current width W is within a certain tolerance of the expected width, as determined in step 242, then an attempt is made to decode the codeword. In step 248, the raw t-sequence is normalized as described above in connection with step 206 in FIG. 23. Then in step 250, the cluster number is determined from the normalized t-sequence. The cluster number may be determined from the t-sequence (as opposed to the X-sequence described above) as follows:

cluster number=$(T_1-T_2+T_5-T_6)$mod 9.

For codewords in PDF417, valid cluster numbers are 0, 3, and 6. If in step 252 it is determined that the cluster number is not 0, 3, or 6, then the codeword is not valid. Accordingly, in step 254 the cluster number and value are set to "BAD" to indicate that the codeword was not successfully decoded.

Otherwise, in step 256, the normalized t-sequence and its cluster number are used to find the corresponding codeword value in a look-up table. If no corresponding codeword value is found for the t-sequence, then the codeword value is set to "BAD" to indicate that it was not successfully decoded.

Finally, in step 258 the "last width" value is updated to the current width W of the codeword for use in decoding the next codeword value from the scan line.

Figure 28A:
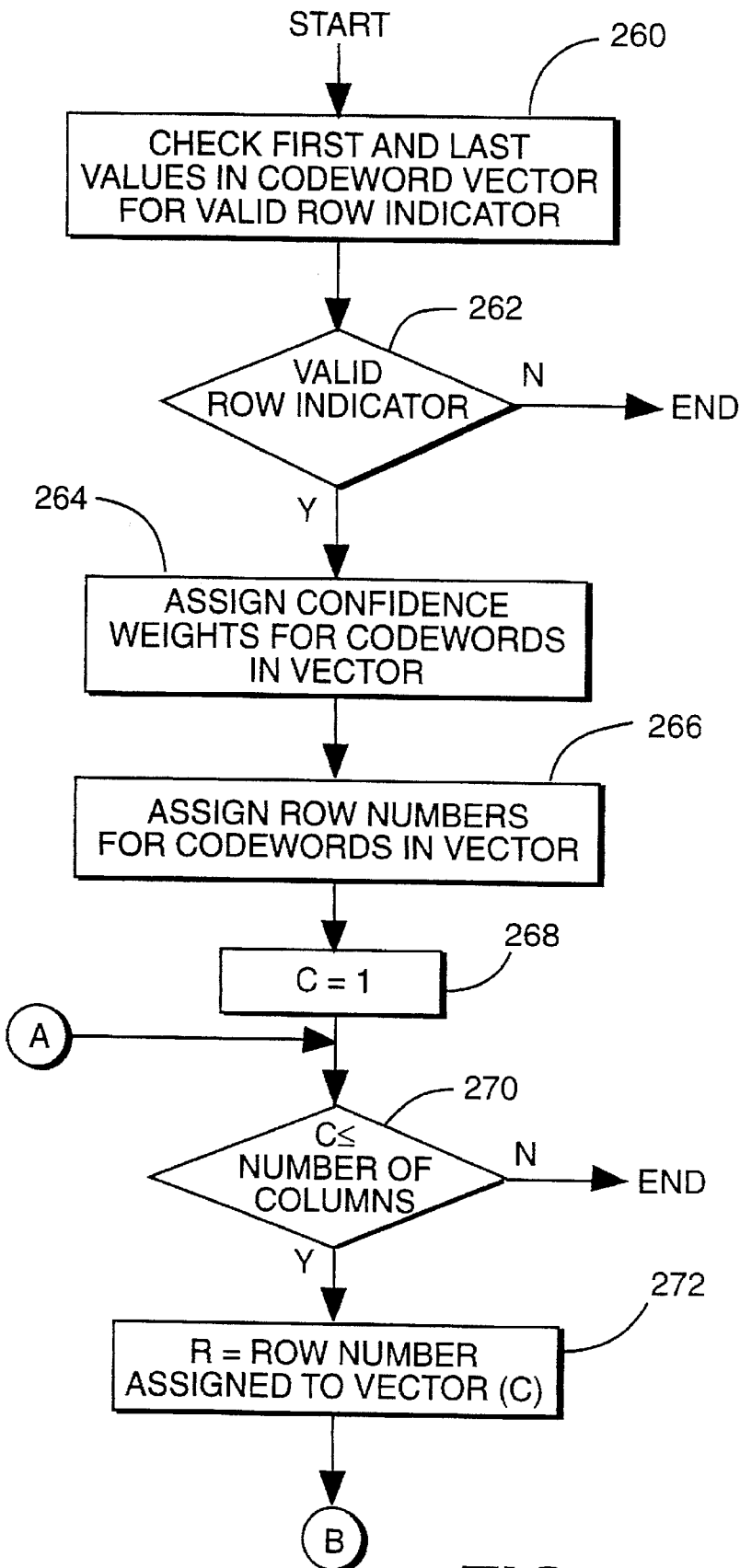
FIGS. 28A and 28B together are a flow diagram of the steps performed by the low-level decoder in order to update the codeword matrix using the codeword vector.
Figure 28B:
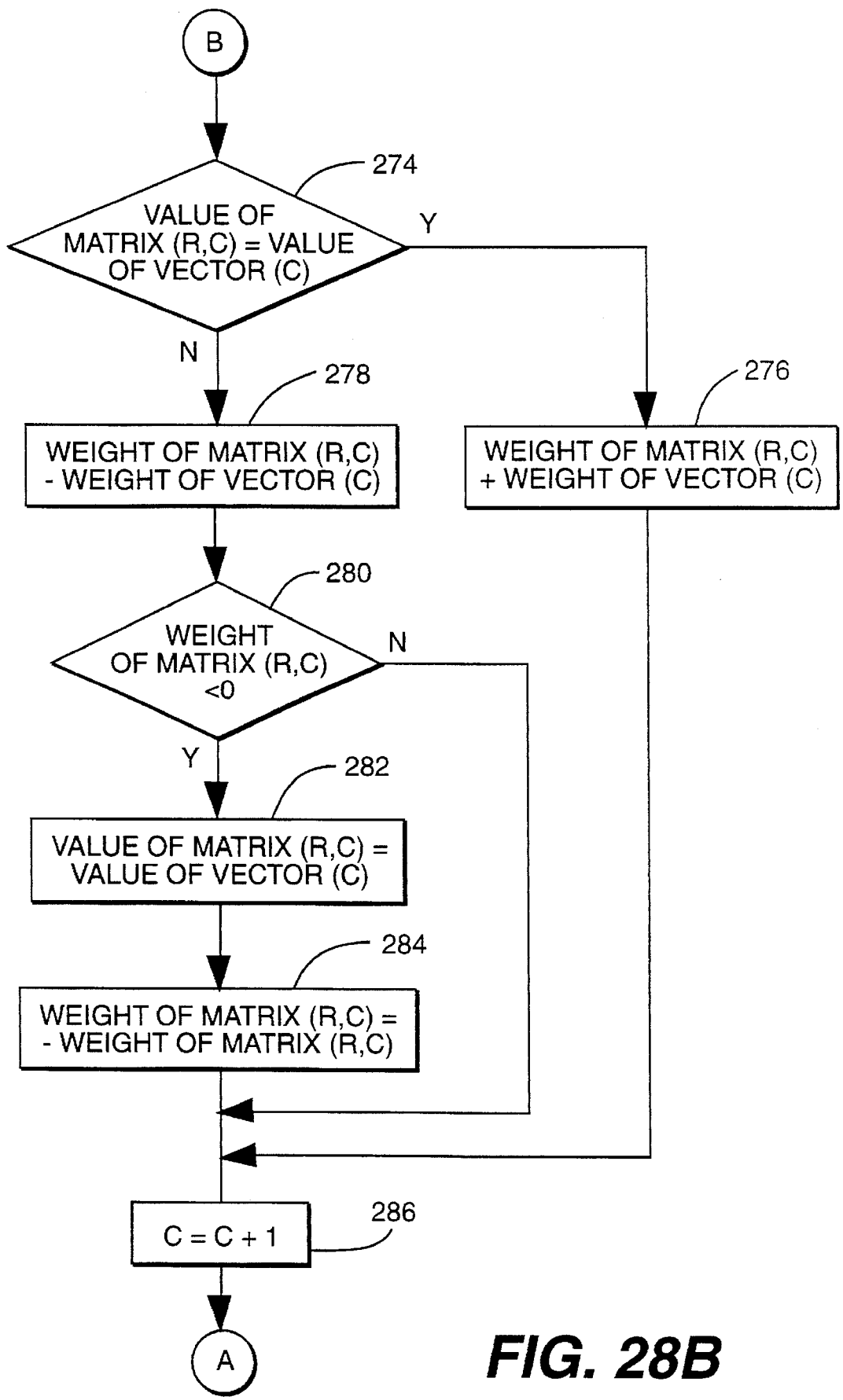

FIGS. 28A and 28B together comprise a flow chart of the sequence of steps executed by the low-level decoder in order to update the codeword matrix using the codeword vector. These figures explain in greater detail step 164 in FIG. 21 discussed above.

The first step 260 of FIG. 28A checks the first and last values in the codeword vector to see if either is a valid row indicator. If neither the first nor the last values in the codeword vector is a valid row indicator, then in step 262 the program exits the routine and no attempt is made to update the codeword matrix using the codeword vector.

If a valid row indicator is present, however, then in step 264 confidence weights are assigned to each codeword value in the codeword vector. Specifically, a confidence weight is assigned to each codeword depending on whether its nearest neighbors and their cluster were also decoded. For example, as shown in FIG. 26B, the codeword values in columns 1, 2, 3, 9, and 10 are assigned high confidence weights ("H") because their immediate neighbors were also successfully decoded and have the same cluster number. The codeword values for columns 4 and 8 are assigned medium confidence weights ("M") because one of their neighbors was successfully decoded and has the same cluster number but the other neighboring codeword value is "BAD." The codeword value in column 3 is assigned a very low confidence weight ("L") because neither of its neighbors was successfully decoded. Thus, the confidence weight for a codeword value at column i in the codeword vector is essentially a function of the cluster numbers of the codewords at columns i−1, i, and i+1. This function may be implemented by a look-up table whose index is calculated from the cluster numbers of the three codewords.

In step 266, a row number is assigned to each codeword value in the codeword vector based on the row indicator codewords and the cluster numbers. As shown in the example in FIG. 26C, the left row indicator codeword $L_2$ indicates that the row number is 2 and the cluster number is 6. The cluster numbers for the codeword values in columns 2–4 are also 6. Therefore, row number 2 is assigned to the codeword values in the first four columns of the codeword vector.

Also in the example in FIG. 26C, columns six and 8–10 all have a cluster number of 3 and the right row indicator codeword $R_1$ indicates that the row number is 1. Therefore, it can be assumed that the scan line crossed the row boundary between row 2 and row 1 and the codeword values in columns 6 and 8–10 should be assigned to row 1.

Once the confidence weights and row numbers have been assigned to each of the codeword values in the codeword vector, the codeword matrix is updated one codeword at a time. In step 268, the column number C of both the codeword vector and the codeword matrix is set is initially set to "1." Step 270 is the first step of an iterative loop which steps through the codewords in the codeword vector and uses them to update the corresponding codewords and their associated confidence weights in the codeword matrix. When the column number C exceeds the number of columns in step 270, then all of the codewords in the codeword vector have been processed and the routine ends.

For each codeword in the codeword vector, step 272 sets the row number R of the codeword matrix to the row number assigned in step 266 to the codeword in the codeword vector at the location C. Thus, for each codeword value in the codeword vector, there is a corresponding value in the codeword matrix at location [R,C].

Continuing in FIG. 28B, step 274 determines whether the current codeword value in location [R,C] in the codeword matrix is the same as the corresponding codeword value in the codeword vector at column C. If the values are the same, then in step 276, the confidence weight assigned to the codeword value in matrix location [R,C] is increased by the confidence weight of the corresponding codeword value in the codeword vector. If not, the confidence weight of the codeword value in the matrix is decreased by the confidence weight of the codeword value in the vector in step 278.

If the confidence weight was decreased in step 278, then in step 280 that confidence weight is tested to see if it was decreased below zero. If the confidence weight is less than zero, then in step 282 the new codeword value in the codeword vector is substituted for the current codeword value in the corresponding location in the codeword matrix. The confidence weight assigned to the codeword value in the matrix is also changed to a positive value in step 284.

Finally, in step 286 the column number C is incremented by 1 for processing the next codeword value in the codeword vector and program control is returned to step 270 for repeating steps 272 through 286 for all of the columns in the vector.

Returning briefly to step 154 in FIG. 21, each time after the codeword matrix has been filled in with the new vector of codeword values and the confidence weights have been updated, an attempt is made to fill in the rest of the matrix using the built in error correction capability of the symbol. The number and location of codewords which have not yet been successfully decoded may be determined by comparing the confidence weights assigned to each of the codeword values in the matrix with a predetermined threshold. Those values having confidence weights below the threshold are considered to not yet be decoded. If the number of codewords not yet decoded is less than the error correction capability of the symbol as determined by the security level, then an attempt is made to correct the matrix.

It will be apparent to those skilled in the art that various modifications and variations can be made in the decoding method and apparatus without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for storing and managing inventory comprising:

(a) an inventory item holder holding at least one inventory item;

(b) an inventory item record comprising a bar code symbol label applied to said inventory item holder, said record including encoded item identification information identifying the at least one inventory item, and reordering information for the at least one inventory item;

(c) a bar code reader including means for decoding said bar code symbol label to obtain said item identification information and said reordering information;

(d) means for comparing a count of the number of said inventory items physically present at the inventory holder with a reorder count in said reordering information; and (e) means, responsive to the comparing means, for generating a reorder message.

2. The system for storing and managing inventory according to claim 1, wherein the bar code symbol label is a two-dimensional bar code symbol label, and the bar code reader comprises:

means for reading two-dimensional bar code symbol data in PDF417 format from the label applied to said inventory item holder; and decoding means for generating item-related information signals derived from said read two-dimensional bar coded symbol data.

3. The system for storing and managing inventory according to claim 1, wherein the symbol on the bar code symbol label comprises:

a plurality of ordered, adjacent rows of codewords of bar-coded information from a set of codewords, the set of codewords being partitioned into at least three mutually exclusive clusters, each row in the symbol having at least one row indicator codeword and containing only codewords from a cluster different from the codewords in an adjacent row.

4. The system for storing and managing inventory according to claim 1, wherein the decoding means comprises:

means for scanning the bar code symbol to produce scan lines of data representing the bar-coded information in codewords of the symbol, means for decoding a scan line of data into a vector of codeword values corresponding to the codewords that were scanned, at least one of the codeword values being for a row indicator codeword, means for assigning a row number to each of the codeword values in the vector based on the value of the row indicator codeword and a cluster of the codeword, and means for filling in a codeword matrix with the codeword values in the vector according to their assigned row numbers.

5. The system of claim 4 wherein the row indicator codewords contain information regarding the number of rows in the symbol and the number of codewords in each row, and wherein the decoding means includes:

means for decoding a scan line of data to obtain a codeword value of a row indicator codeword, and means for determining one of the number of rows and the number of codewords in each row from the codeword value for the row indicator codeword.

6. The system of claim 4, wherein each row of the bar code symbol contains a start pattern and a stop pattern of bar-coded information, and wherein the means for decoding a scan line of data in said decoding means includes means for locating a sequence of data in the scan line corresponding to one of the start and the stop patterns.

7. The system of claim 1, wherein the symbol contains at least one error correction codeword, and row indicator codewords contain information regarding the number of rows in the symbol, the number of codewords in each row, and the number of error correction codewords, and wherein the decoding means comprises:

means for decoding a scan line of data to obtain a codeword value for a row indicator codeword, means for determining a value for one of the number of rows, the number of codewords in each row, and the number of error correction codewords from the codeword value for the row indicator codeword, means for adjusting a confidence weight for a corresponding one of the number of rows, the number of codewords in each row, and the number of error correction codewords based on the value determined in the preceding step and a previous value obtained by decoding a row indicator codeword, and means for initializing a codeword matrix when confidence weights for the number of rows, the number of codewords in each row, and the number of error correction codewords all exceed a predetermined threshold.

8. The system of claim 1 wherein the at least one inventory item is a plurality of items and the system further includes a container for carrying the plurality of items from an origination point to a plurality of destination points via a redistribution point, and the encoded item identification information of the bar code label includes destination information for said plurality of items, the system further comprising:

(f) bar code reader means at the redistribution point for decoding the bar code symbol label; and (g) means for transporting said plurality of items from the redistribution point to a destination point identified by the destination information.

9. The system of claim 1 wherein the system further includes a container, said at least one inventory item includes a plurality of items carried in said container, each said item having a selected destination and the bar code symbol label is a machine readable two-dimensional bar code symbol label applied to said container, said bar code symbol label containing destination information for each of said plurality of items.

10. A system for storing and managing inventory comprising:

an inventory item holder for holding at least one inventory item;

an inventory item record, including a first bar code symbol label applied to said inventory item holder, said record including encoded item identification information identifying the at least one inventory item and reordering information for the at least one inventory item;

a first bar code reader for decoding said first bar code symbol label to obtain said item identification information and said reordering information;

means for comparing a count of the number of said inventory items physically present at the inventory holder with a reorder count in said reordering information;

means, responsive to the comparing means, for generating a reorder message;

means for transmitting an order derived from the reorder message to an origination point for the transportation of reorder ones of said at least one inventory item;

means for generating a second bar code symbol label for application to the at least some of said at least one inventory item, containing item destination information identifying a destination point;

means for transporting the reorder ones of said at least one inventory item from the origination point to a redistribution point;

a second bar code reader at said redistribution point, including means for decoding the second bar code symbol label relating to said item destination information; and means for transporting the reorder ones of said at least one inventory item from the redistribution point to the destination point identified by the item destination information.

11. The system for storing and managing inventory according to claim 10, wherein the first and second bar code symbol labels are two-dimensional bar code symbol labels, and each of the first and second bar code readers comprises:

means for reading two-dimensional bar code symbol data in PDF417 format.

12. The system for storing and managing inventory according to claim 10 wherein the bar code symbol on the first and second bar code symbol labels comprises:

a plurality of ordered, adjacent rows of codewords or bar-coded information from a set of codewords, the set of codewords being partitioned into at least three mutually exclusive clusters, each row in the symbol having at least one row indicator codeword and containing only codewords from a cluster different from the codewords in an adjacent row.

13. The system of claim 12 wherein the row indicator codewords contain information regarding the number of rows in the symbol and the number of codewords in each row, and wherein the decoding means includes:

means for decoding a scan line of data to obtain a codeword value of a row indicator codeword, and means for determining one of the number of rows and the number of codewords in each row from the codeword value for the row indicator codeword.

14. The system of claim 12, wherein each row of the bar code symbol contains a start pattern and a stop pattern of bar-coded information, and wherein the means for decoding a scan line of data in said decoding means includes means for locating a sequence of data in the scan line corresponding to one of the start and the stop patterns.

15. The system of claim 12, wherein the symbol contains at least one error correction codeword, and row indicator codewords contain information regarding the number of rows in the symbol, the number of codewords in each row, and the number of error correction codewords, and wherein each of the first and second bar code readers comprises:

means for decoding a scan line of data to obtain a codeword value for a row indicator codeword, means for determining a value for one of the number of rows, the number of codewords in each row, and the number of error correction codewords from the codeword value for the row indicator codeword, means for adjusting a confidence weight for a corresponding one of the number of rows, the number of codewords in each row, and the number of error correction codewords based on the value determined in the preceding step and a previous value obtained by decoding a row indicator codeword, and means for initializing a codeword matrix when confidence weights for the number of rows, the number of codewords in each row, and the number of error correction codewords all exceed a predetermined threshold.

16. The system for storing and managing inventory according to claim 10 wherein each of the first and second bar code readers comprises:

means for scanning the bar code symbol to produce scan lines of data representing the bar-coded information in codewords of the symbol, means for decoding a scan line of data into a vector of codeword values corresponding to the codewords that were scanned, at least one of the codeword values being for a row indicator codeword, means for assigning a row number to each of the codeword values in the vector based on the value of the row indicator codeword and a cluster of the codeword, and means for filling in a codeword matrix with the codeword values in the vector according to their assigned row numbers.

17. A system for storing and managing inventory comprising:

(a) an inventory item holder holding at least one inventory item;

(b) an inventory item record comprising a two-dimensional bar code symbol label applied to said inventory item holder, said record including encoded item identification information identifying the at least one inventory item, and reordering information for the at least one inventory item;

(c) a two-dimensional bar code reader including means for decoding said two-dimensional bar code symbol label to obtain said item identification information and said reordering information;

(d) means for comparing a count of the number of said inventory items physically present at the inventory holder with a reorder count in said reordering information; and (e) means, responsive to the comparing means, for generating a reorder message.

18. A system for storing and managing inventory comprising:

an inventory item holder for holding at least one inventory item;

an inventory item record, including a two-dimensional bar code symbol label applied to said inventory item holder, said record including encoded item identification information identifying the at least one inventory item and reordering information for the at least one inventory item;

a two-dimensional bar code reader for decoding said two-dimensional bar code symbol label to obtain said item identification information and said reordering information;

means for comparing a count of the number of said inventory items physically present at the inventory holder with a reorder count in said reordering information;

means, responsive to the comparing means, for generating a reorder message;

means for transmitting an order derived from the reorder message to an origination point for the transportation of reorder ones of said at least one inventory item;

means for generating a two-dimensional bar code symbol label for application to the at least some of said at least one inventory item, containing item destination information identifying a destination point;

means for transporting the reorder ones of said at least one inventory item from the origination point to a redistribution point;

a bar code reader at said redistribution point, including decoding means for decoding the two-dimensional bar code symbol label relating to said item destination information; and means for transporting the reorder ones of said at least one inventory item from the redistribution point to the destination point identified by the item destination information.

19. A method for storing and managing at least one inventory item to which an inventory item holder is connected, said inventory item holder having a bar code symbol label including encoded item identification information identifying the at least one inventory item and reordering information for the at least one inventory item, the method comprising the steps of:

decoding said bar code symbol label to obtain said item identification information and said reordering information;

comparing a count of the number of said inventory items physically present at the inventory holder with a reorder count in said reordering information; and generating a reorder message based on a result of the comparing.

20. The method of claim 19, further comprising the step of transmitting an order derived from the reorder message to an origination point for the transportation of reorder ones of said at least one inventory item.

21. The method of claim 20, further comprising the steps executed at the origination point of:

generating a second bar code symbol label containing item destination information identifying a destination point; and transporting the reorder ones of said at least one inventory item from the origination point to a redistribution point with the second bar code symbol label attached.

22. The method of claim 21, further comprising the steps executed at the redistribution point of:

decoding the second bar code symbol label relating to said item destination information; and transporting the reorder ones of said at least one inventory item from the redistribution point to the destination point based on said decoded item destination information.

* * * * *

UNITED STATES PATENT AND TRADEMARK OFFICE
CERTIFICATE OF CORRECTION

PATENT NO. : 5,646,389

DATED : July 8, 1997

INVENTOR(S) : Bravman et al.

It is certified that error appears in the above-indentified patent and that said Letters Patent is hereby corrected as shown below:

Title page, item [75], lines 2-3 under "Inventors", change "Meyers, Fla." to --Fort Meyers, Fla.--, and change "D.C. Toedt, III" to --D.C. Toedt III--.

Signed and Sealed this

Second Day of September, 1997

*Attest:*

BRUCE LEHMAN

*Attesting Officer*  *Commissioner of Patents and Trademarks*